US008401270B2

(12) United States Patent
Eilbert et al.

(10) Patent No.: US 8,401,270 B2
(45) Date of Patent: Mar. 19, 2013

(54) EXAMINATION OF A REGION USING DUAL-ENERGY RADIATION

(75) Inventors: Richard F. Eilbert, Lincoln, MA (US);
David Perticone, Winchester, MA (US);
Shuanghe Shi, Southborough, MA (US);
Jeff Stillson, Merrimack, NH (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 945 days.

(21) Appl. No.: 12/484,709

(22) Filed: Jun. 15, 2009

(65) Prior Publication Data

US 2010/0290691 A1   Nov. 18, 2010

Related U.S. Application Data

(60) Provisional application No. 61/061,414, filed on Jun. 13, 2008.

(51) Int. Cl.
*G06K 9/00* (2006.01)

(52) U.S. Cl. ........ 382/141; 382/100; 382/254; 382/276; 382/282; 250/306; 250/358.1; 250/390.04; 250/496.1; 378/19; 378/57; 378/51; 378/82; 378/83; 378/86; 378/87; 378/88

(58) Field of Classification Search ........................ None
See application file for complete search history.

(56) References Cited

U.S. PATENT DOCUMENTS

| | | | |
|---|---|---|---|
| 5,313,511 A | 5/1994 | Annis et al. | |
| 5,319,547 A | 6/1994 | Krug et al. | |
| 5,524,133 A | 6/1996 | Neale et al. | |
| 5,600,700 A | 2/1997 | Krug et al. | |
| 5,943,160 A | 8/1999 | Downing | |
| 6,936,820 B2 * | 8/2005 | Peoples | 250/336.1 |
| 7,257,188 B2 | 8/2007 | Bjorkholm | |
| 7,453,987 B1 * | 11/2008 | Richardson | 378/98.9 |
| 7,630,474 B2 * | 12/2009 | Clayton | 378/57 |
| 7,636,417 B2 * | 12/2009 | Bjorkholm | 378/53 |
| 7,649,977 B2 * | 1/2010 | Johnson | 378/57 |
| 7,873,201 B2 * | 1/2011 | Eilbert et al. | 382/141 |
| 7,957,505 B1 * | 6/2011 | Katz et al. | 378/57 |
| 8,023,619 B2 * | 9/2011 | McNabb et al. | 378/106 |
| 8,263,938 B2 * | 9/2012 | Bjorkholm | 250/358.1 |
| 2005/0105665 A1 * | 5/2005 | Grodzins et al. | 376/157 |
| 2006/0188060 A1 * | 8/2006 | Bertozzi et al. | 378/57 |
| 2007/0183568 A1 * | 8/2007 | Kang et al. | 378/57 |

(Continued)

OTHER PUBLICATIONS

Lehmann, L.A., et al., "Generalized Image Combinations in Dual KVP Digital Radiography," *Med. Phys.*, vol. 8, No. 5, Sep./Oct. 1981, pp. 659-667.

(Continued)

*Primary Examiner* — Matthew Bella
*Assistant Examiner* — Jason Heidemann
(74) *Attorney, Agent, or Firm* — Fish & Richardson P.C.

(57) ABSTRACT

A first image including a projection of a portion is generated based on data representing attenuation of higher-energy radiation having a peak energy of at least 1 MeV that passes through a portion of an inspection volume. A second image including a projection of the portion is generated based on data representing attenuation of lower-energy radiation passing through the portion of the inspection volume. A dual-pixel image is created from the first image and the second image. A region of interest is selected from the dual-pixel image. A first basis function that is derived from an attenuation characteristic associated with the region of interest is selected. The region of interest is represented in terms of an amplitude associated with the first basis function and an amplitude associated with the second basis function.

36 Claims, 16 Drawing Sheets

U.S. PATENT DOCUMENTS

| | | |
|---|---|---|
| 2007/0210255 A1 | 9/2007 | Bjorkholm |
| 2007/0241282 A1* | 10/2007 | Clayton et al. ............. 250/358.1 |
| 2007/0242797 A1* | 10/2007 | Stewart et al. .................. 378/16 |
| 2007/0269013 A1 | 11/2007 | Liu et al. |
| 2008/0013819 A1 | 1/2008 | Eilbert et al. |
| 2008/0205594 A1* | 8/2008 | Bjorkholm ...................... 378/53 |
| 2009/0065712 A1* | 3/2009 | Zillmer et al. ............. 250/496.1 |
| 2009/0175412 A1* | 7/2009 | Grodzins et al. ................ 378/57 |

OTHER PUBLICATIONS

Eilbert, R.F., and Krug, K.D., "Dual Energy X-Ray Scanner for Detecting Contraband," *Contraband and Cargo Inspection Technology International Symposium Proceedings*, Oct. 28-30, 1992, pp. 209-217.

Ogorodnikov, S., and Petrunin, V., "Processing of Interlaced Images in 4-10 MeV Dual Energy Customs System for Material Recognition," *Physical Review Special Topics—Accelerators and Beams,* vol. 5, No. 104701, pp. 1-11.

International Search Report and Written Opinion for corresponding International Application No. PCT/US09/47380, mailed Sep. 9, 2009, 8 pages.

\* cited by examiner

EXAMINATION OF A REGION USING DUAL-ENERGY RADIATION

CROSS-REFERENCE TO RELATED APPLICATION

This application claims the benefit of U.S. Provisional Application No. 61/061,414, filed Jun. 13, 2008 and titled MATERIAL DISCRIMINATION USING MeV RANGE DUAL-ENERGY PHOTONS, which is incorporated by reference in its entirety.

STATEMENT REGARDING FEDERALLY SPONSORED RESEARCH OR DEVELOPMENT

The U.S. Government may have certain rights in this invention pursuant to the terms of contract no. HSHQDC-06-D-00074 awarded by the Domestic Nuclear Detection Office Organization (DNDO).

TECHNICAL FIELD

This disclosure relates to examination of a region using dual-energy radiation.

BACKGROUND

Two pre-defined and fixed basis materials may be used to characterize an item of interest represented in an image.

SUMMARY

In one general aspect, an inspection volume is examined. A first image is generated based on data representing attenuation of higher-energy radiation having a peak energy of at least 1 MeV that passes through a portion of an inspection volume. A second image is generated based on data representing attenuation of lower-energy radiation passing through the portion of the inspection volume. A dual-pixel image is created from the first image and the second image. A pixel of the dual-pixel image, a pixel of the first image, and a pixel of the second image represent substantially the same portion of the inspection volume. A region of interest is selected from the dual-pixel image. A first basis function that is derived from an attenuation characteristic associated with the region of interest is selected. The region of interest is represented in terms of an amplitude associated with the first basis function and an amplitude associated with the second basis function.

Implementations may include one or more of the following features. The region of interest may include an item of interest and an associated background region. The imaged background region may coincide with at least a portion of the item of interest. The amplitude associated with the first basis function and the amplitude associated with the second basis function may be computed for a selected region within the item of interest and a selected region within the associated background, and a property of the item of interest may be derived based on both an amplitude associated with the first basis function and an amplitude associated with the second basis function A property of the region of interest may be determined based on an amplitude associated with the first basis function and an amplitude associated with the second basis function in the selected region of interest. The property of the item of interest may be an effective atomic number. The attenuation characteristic may be a measured attenuation of photon intensity. The attenuation characteristic may be a measured attenuation of photon intensity. The measured attenuation of photon intensity may be the measured attenuation of photon intensity in the selected region of background.

In some implementations, one of the first basis function and the second basis function may correspond to a material that has an effective atomic number similar to an effective atomic number of the associated background. The first basis function may correspond to a first material, and the second basis function may correspond to a second material. The first material may be an elemental material and the second material may be an elemental material having a different effective atomic number than the first material. The low-energy image may represents an attenuation of the lower-energy radiation caused by passing the lower-energy radiation through the inspection volume, and the high-energy image may represent an attenuation of the higher-energy radiation caused by passing the higher-energy radiation through the inspection volume.

In some implementations, the data representing the inspection volume may be generated by a sequence of measurements associated with a one-dimensional array. The selected region within the item of interest and the selected region of background may be represented with two pre-selected basis materials, and a ratio of the amplitudes of the two pre-selected basis materials may be determined. The emitted higher-energy radiation and the emitted lower-energy may have an energy distribution that is substantially not mono-energetic. An amplitude of the selected first basis function and the second basis function may be determined, an image of the inspection volume including the item of interest may be generated. The image of the item of interest including a pixel may have a pixel value equal to a function of the amplitude of the first basis function and the second basis function, and the image of the item of interest may be displayed.

Whether the item includes a material of interest may be determined based on the property of the item of interest. A third data representing the inspection volume may be accessed, and the third data and the image of the item of interest may be displayed. The third data may be data that represents the inspection volume using energy of a different type than the higher-energy radiation and the lower-energy radiation. The third data may be an image of the inspection volume taken with a sensor sensitive to visible or infrared radiation. The third data and the image of the item of interest may be displayed concurrently. The item of interest may include a material of interest, and a marker may be displayed to indicate the presence of the material of interest.

In some implementations, the region of interest may be decomposed based on three or more basis functions, the amplitudes of the basis functions in the region of interest may be determined, and a property of the region of interest may be determined based on the amplitudes of the basis functions. A pixel of the dual-pixel image may be associated with an attenuation value corresponding to the lower-energy radiation and an attenuation value corresponding to the higher-energy radiation. The portion of the inspection volume may encompass the entire inspection volume. At least one of the amplitude of the first basis function or the amplitude of the second basis function may be derived by using a predetermined formula or using a precomputed lookup table having inputs that are derived from the dual-pixel image data. An indication of an areal density of a selected portion of the region of interest may be estimated based on the amplitude of the first basis function and the amplitude of the second basis function. The indication of an areal density estimate may be further based on an indicator of estimated effective atomic number. The indicator of the effective atomic number a selected portion of the region of interest may be estimated based on the amplitude of the first basis function and the amplitude of the second basis function. The effective atomic number estimate may be further based on an indicator of estimated areal density.

In another general aspect, data representing an attenuation of penetrating radiation having a number, N, of energy spectra passing through an inspection volume is accessed. The peak energy of one of the spectra is above 1 MeV. A multi-pixel image is created from the accessed data, where a first pixel layer of the multi-pixel image represents substantially the same portion of the inspection volume as a corresponding pixel in a second pixel layer. The multi-pixel image data is transformed into another multi-pixel image derived from M amplitudes associated with M basis functions, where M does not exceed N.

Implementations may include one or more of the following features. At least one of the spectra may include x-ray photons. An item of interest may be identified within the multi-pixel image, and whether the item of interest is a material interest is determined. If the material is a material of interest, a first action is performed, and if the material is not a material of interest, a second action that is different from the first action is performed.

In another general aspect, data representing an attenuation of penetrating radiation passing through an inspection volume is accessed. The penetrating radiation has at least two energy spectra, the peak energy of one or more of the spectra being above 1 MeV. A multi-layer image is created from the accessed data, where a pixel in a first layer of the multi-layer image represents substantially the same portion of the inspection volume as a pixel in the second layer of the multi-pixel image. The first pixel layer is associated with an attenuation value representative of the attenuation of a particular energy spectra, and the second pixel layer is associated with an attenuation value representative of the attenuation of a particular energy spectra. An image of the inspection volume that represents an interaction between the inspection volume and an additional type of radiation is accessed, and the multi-pixel image and the image of the inspection volume is displayed.

In some implementations, the additional type of radiation may be a neutron beam.

Implementations of the techniques discussed above may include a method or process, a system or apparatus, a device, an inspection machine, or computer software on a computer-readable medium.

DESCRIPTION OF THE DRAWINGS

Like reference numbers refer to like elements.

DETAILED DESCRIPTION

Figure 1:
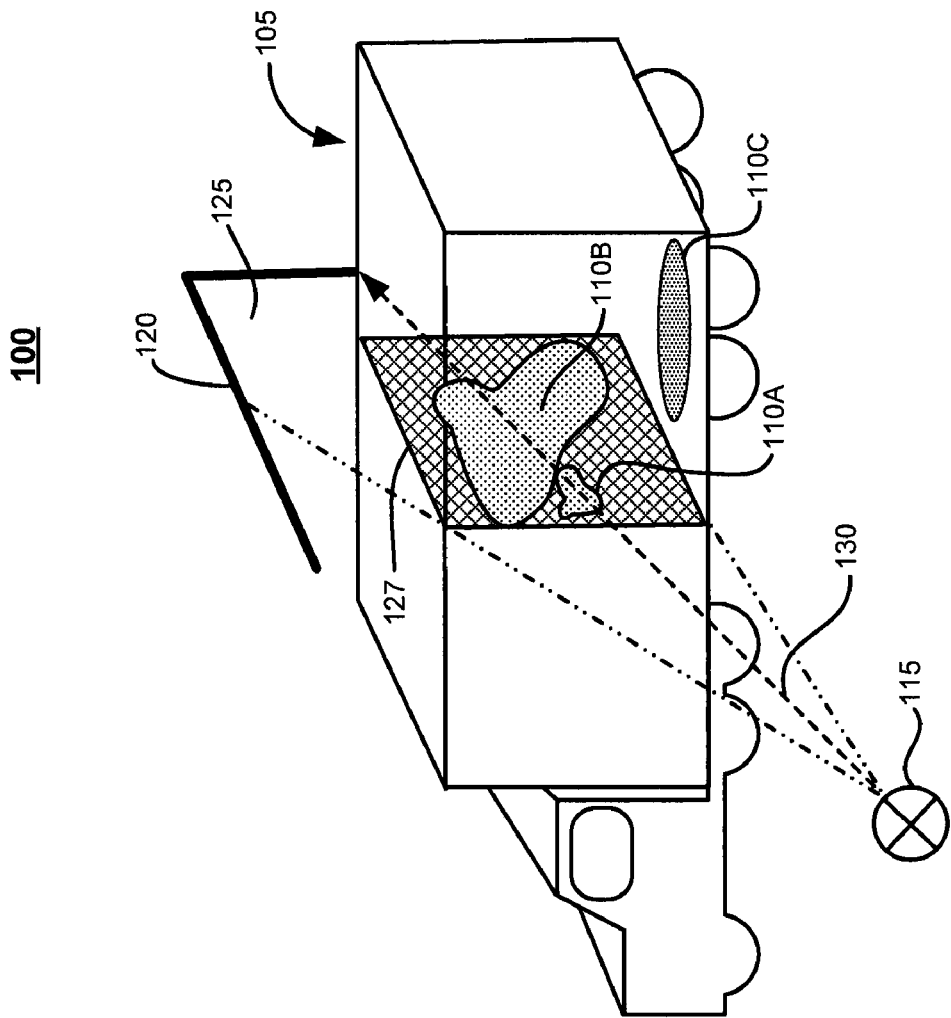
FIG. 1 is a perspective view of an example inspection system.

Techniques are described for discriminating materials using dual-energy photons having energies in the mega-electron volt (MeV) range. Such techniques may be used to identify objects and discriminate materials hidden among normal cargo inside of an inspection volume. The inspection volume may be a large object such as a containerized cargo, container ship, truck, rail car, or another large object used in the transportation system. The inspection volume may take other forms. For example, the inspection volume may be a space, region, object or a collection of discrete items that does not have a well-defined boundary, such as a fluid flow. The inspection volume may be a relatively small volume, such as a volume encompassed by a piece of luggage. As discussed in greater detail with respect to FIGS. 1-9, a basis function that is derived from an attenuation characteristic of a region of the inspection volume is selected, and an item of interest within the inspection volume is represented with the selected basis function.

A basis functions is a mathematical function of a variable, in this implementation, photon energy. A basis function may be more than one function. The objective is to weight each basis function so that the weighted sum of the basis functions closely matches the attenuation coefficient of the target, at, for example, some particular pixel. Such a weight may be considered to be an amplitude of the associated basis function. At energies below 200 keV and for targets that are not of high Z, it is know that with good accuracy, two specific basis functions are sufficient to represent such targets. In this situation, the basis functions may be taken as the attenuation coefficients of any two (non-high Z) materials. However, basis functions that do not correspond to any particular material can also be employed, for example one basis function may represent the energy dependency of photo-electric absorption and the other basis function may represent the energy dependency incoherent scattering. If the basis functions are taken as specified materials, the amplitudes may be equated with the specific thicknesses, for example, measured as an areal density, of such materials that are required to represent the target's measured HI and LO attenuations, as discussed below. For completeness in the representation, such amplitudes may be allowed to assume negative values.

Above 1 MeV, the dual basis function representation becomes less useful due to the onset of pair production. Two basis functions may still be used to represent the target, but the approximation becomes less accurate. More than two basis functions could be employed, but deriving such amplitudes would require an equivalent number of attenuation measurements. That is, two attenuation measurements would be insufficient to determine three or more such amplitudes for a given pixel. In analyzing a specific region within an object, one means of reducing the approximate nature of the two basis-function representation is to choose specific basis functions appropriate for that region rather than relying on fixed, pre-selected basis functions. Basis decomposition refers to the process of selecting appropriate basis functions and deriving amplitudes for each basis function by a transformation of the original data, for example by remapping on a pixel-by-pixel basis. Techniques that use a dual energy basis decomposition for material discrimination in the kilo-electron volt (keV) range may not fully characterize an object in the presence of an unknown background. However, by choosing a basis material to match the background material, an object may be characterized (or perhaps identified) in the presence of the background. Pre-computing a material decomposition table for every conceivable background material, or even many possible background materials, may be inefficient. Thus, in some implementations, a small set of pre-defined material decomposition tables may be used. Interpolating between the two decomposition tables closest to (or perhaps most similar to) the estimated background material can be used to determine the thickness and atomic number properties of a material that overlays some unknown background material. The material that overlays or underlays the unknown background material may be referred to as a foreground item, and the unknown background material may be referred to as a background item. As compared to techniques that use single table material decomposition, using a set of material decomposition tables may improve the accuracy of the effective atomic number ($Z_{\text{eff}}$) estimation in the MeV range. Additionally, the techniques may be used for automated detection of objects using material discrimination for large containers (such as trucks, shipping containers, rail cars, and containerized cargo).

In particular, the techniques discussed below may be useful in determining properties of target objects inside of large (and perhaps thickly walled) containers in the presence of overlying and/or underlying background material. One such property is the atomic number of the target or the material of the target. In some implementations, the Alvarez-Macovski's basis function decomposition is generalized beyond the original range of applicability.

Dual energy x-rays in the MeV range (perhaps with beam preparation and filtration) may be used to associate a HI and LO attenuation value with a unique elemental material and the material's thickness. However, the association may break down if the material overlays some background material. Additionally, knowing the incremental HI and LO attenuation from the material of interest may not be sufficient to determine the material in a precise or unique manner. The techniques used at lower energy (30 to 200 keV range) of converting HI and LO attenuation to dual basis functions may not be effective in the MeV range because the inherent assumptions of such techniques may no longer be valid.

Techniques are described for estimating thickness and atomic number properties of a material that overlays some unknown background material. The described techniques may provide an advantage in determining and, perhaps, identifying a variety of threats with enhanced accuracy. MeV range x-rays may be used for imaging cargo containers, trucks and the like.

Typical thicknesses for imaging range up to 300 gm/cm$^2$, which may be roughly an order of magnitude thicker than that used in, for example, baggage screening systems. Threats of interest may include explosives, nuclear material and/or shielding, drugs and other illicit material.

Techniques are described for discriminating materials inside of a scanned object (or container) from an unknown background based on using dual-energy photons in the MeV range. Such scans can be obtained, for example, by using sources, such as two Linacs operating at different energy settings or by using a Linac that switches rapidly between two energy settings. The energy settings may be in the 5 to 9 MeV range for the HI beam, and the LO beam may operate at roughly 40 to 70% of the HI energy value. Detectors may be in a linear array with respect to the inspection volume, and the object may be moved relative to the scanner to build an image of HI and LO pixels. These images may be referred to as a HI image and a LO image, respectively. Such an image may be referred to as a dual pixel image. Various registration schemes may be employed such that the HI and LO images geometrically coincide.

HI and LO pixel numerical values correspond to their respectively measured beam attenuation. Beam attenuation refers to the reduction in measured beam strength (for example, beam flux or intensity) with a target present in the beam as compared against a similarly measured strength with the target absent. Example measures of attenuation are the ratio of such strengths and the logarithm of such strengths.

The dual pixel image may, for example, be segmented to locate targeted regions or items of interest. A high-Z material may be identifiable as a region of increased attenuation relative to its immediate background. The immediate background may be a localized background that is seen unobscured relatively near to the item of interest, for example a high-Z material, in the projection image. In real space, the background is not necessarily touching or otherwise contacting item of interest. The background may be considered to be associated with the high-Z material for example by its proximity in the projection image. Once such targeted regions are identified, further analysis may be used to estimate the size of the material, areal density thickness and effective atomic number. The image of the material may be assumed to have a relatively uniform background locally near the materials edges. This background may be approximated as a single type of material, whose properties (for example, thickness and effective atomic number) are computed. This provides a basis for associating the incremental attenuation arising from a foreground target material (or foreground item) having a specific thickness and atomic number composition. This technique may be applied for lower energy x-ray scans. The background may be considered to establish an operating point, ($HI_B$, $LO_B$) from which a composite pixel of target plus background ($HI_C$, $LO_C$) compared. The incremental attenuations ($\Delta HI$, $\Delta LO$)= ($H_C-RI_B$, $LO_C-LO_B$) and various simple derived functions, for example the ratio ($\Delta HI/\Delta LO$), may be useful indicators of the nature of the overlying target material. Due to beam hardening, the ratio $\Delta HI/\Delta LO$, alone may not adequately determine the $Z_{\text{eff}}$ of the target unless the HI and LO beams are mono-energetic. Using broad spectral x-ray beams, all four values, ($HI_B$, $LO_B$, $\Delta HI$, $\Delta LO$), may be used for material determination.

In some techniques, $Z_{\text{eff}}$ determination may be based on mapping (HI, LO) data into a basis-function representation ($t_P$, $t_Q$), where $t_P$ and $t_Q$ are the thicknesses of two stacked basis materials, P and Q, that produce the same HI and LO attenuations as observed for an actual target. This technique permits negative thickness of P or Q for particular (HI, LO) values. Negative thicknesses of P or Q may be used to represent targets whose $Z_{\text{eff}}$ falls outside the range $Z_{\text{eff}}(P)$ to $Z_{\text{eff}}(Q)$. This mapping is hardening independent, so the ratio $\Delta t_P/\Delta t_Q$ uniquely determines the target's $Z_{\text{eff}}$ to the extent that the basis-decomposition assumptions hold true.

In general, basis functions can be any mathematical functions of a variable, in this case, photon energy. The objective is to weight each function so that the weighted sum of the basis functions closely matches the attenuation coefficient of the target, for example, at some particular pixel. Such a weight may be considered to be an amplitude of the associated basis function. At energies below 200 keV and for targets that are not of high Z, two specific basis functions are generally sufficient to represent such targets. In this situation, the basis functions may be taken as the attenuation coefficients of any two (non-high Z) materials. However, basis functions that do not correspond to any particular material can also be employed, for example one basis function may represent the energy dependency of photo-electric absorption and the other basis function may represent the energy dependency incoherent scattering. If the basis functions are taken as specified materials, the amplitudes may be equated with the specific thicknesses, for example, measured as an areal density, of such materials that are required to represent the target's measured HI and LO attenuations. For completeness in the representation, such amplitudes may be allowed to assume negative values.

Above 1 MeV, the Alvarez-Macovski formalism becomes invalid due to the onset of pair production. Two basis functions may still be used to represent the target, but the approximation becomes less accurate. More than two basis functions could be employed, but deriving such amplitudes would require an equivalent number of attenuation measurements. That is, two attenuation measurements, HI and LO, would be insufficient to determine three or more such amplitudes for a given pixel. In analyzing a specific region within an object, one means of reducing the approximate nature of the two basis-function representation is to choose specific basis functions appropriate for that region rather than relying on fixed, pre-selected basis functions.

However, in the MeV range, the basis-decomposition assumptions are not well supported. Different basis-function representations would indicate different $Z_{eff}$ values for an overlying target. Basis material thicknesses, $t_P$ and $t_Q$, that would produce the measured (HI, LO) value may be found. However, if such basis materials were physically substituted for the actual material, the exiting energy spectrum of the x-ray beam would be different depending on the choice of basis materials. Addition of the same overlying target may result in different composite attenuations ($HI_C$, $LO_C$) depending on which particular basis materials were used to generate the observed background attenuations ($HI_B$, $LO_B$). Conversely, different targets to match the same ($HI_C$, $LO_C$) depending on the particular basis materials used to generate the observed ($HI_B$, $LO_B$). However, one of the basis functions may be chosen as the actual background material. The composition of this material is unknown, but the composition may be estimated from the observed ($HI_B$, $LO_B$) values that the material generates. If one of the basis functions closely matches the background material, then the exiting spectrum would be almost identical. Using such a basis material representation, the overlying target's properties, for example its $Z_{eff}$, may be determined with high accuracy although there is a small dependency on the choice of the second basis material. An iterative series of approximations may be employed to have the second basis material correspond to the target. Iterations may not be necessary for such purposes as identifying high-Z targets. In practice, such iterations are generally not necessary.

In one implementation, initial basis materials such as, boron (Z=5) and californium (Z=99), are chosen to span the conceivable range Z values found in cargo. Regionization of the container is performed based on the HI and LO pixel data from the images. Data is converted to the equivalent B and Cf representation. High-Z regions are identified via the summed amount of the Cf basis material in the region and relatively high value for total $t_{Cf}/(t_B+t_{Cf})$ ratio. Background regions adjacent to the identified high-Z region are located. The $t_{Cf}/(t_B+t_{Cf})$ ratio for each background region is computed, enabling estimation of $Z_{eff}$ of that region. For example, a tungsten target may be inside of a truck and overlay a background of steel and bottled water. The target may overlay the background by being behind the background and/or in front of the background. The basis material that best corresponds to this background material would have a $Z_{eff}$ between steel and water. The $t_{Cf}/(t_B+t_{Cf})$ ratio for the background would determine which $Z_{eff}$ best represents the background and might, in our example, correspond say to aluminum (Z=13).

In some implementations, iterative procedures (based on best matching, with a single material, the (HI, LO) data of the background) may be used to refine the choice of basis material The identified basis material may be referred to as X. The basis functions may be switched to an (X, Cf) representation. In this representation, the thickness of the Cf-basis of the background is now nominally zero since X by its choice well fits the background data just by itself. By comparing the target plus background composite to its local background, the ratio $t_{Cf}/(t_X+t_{Cf})$ is computed for the target or sub-regions thereof. Based on the statistics of the distribution of $t_{Cf}/(t_X+t_{Cf})$ values and their uncertainties, the $Z_{eff}$ of the target can be assigned as material Y. Iterative procedures (based on best matching, with a single material, Y, the ($HI_C$, $LO_C$) data of the background and target composite) could be used to slightly refine our choice of this second basis material if warranted. Finally, a decision whether the target region constitutes a threat can be made on the basis of the $Z_{eff}$ value of Y, its total mass, thickness, shape, location within the inspection volume, statistical uncertainties of estimation plus other contributing factors.

In some implementations multiple, pre-computed tables may be used to represent conversion from (HI, LO) values to basis thicknesses ($t_P$, $t_Q$), for various basis materials P and Q. Instead of tables, analytical formulae may be used for such purposes. Additionally, pre-computed tables or analytic formulae may be used to find material X, which by itself adequately represents the background. Particle and photon transport computational models, such as MCNP or GEANT, may also be used. The pre-computed tables and/or analytic formulae may be based on such models, or on fitting done to actual beam-attenuation measurements or as a semi-empirical combination of both.

Because x-ray spectra from the source vary with beam angle, separate representations can be done for each beam angle. Pre-computed tables or analytical formulae can be worked out for a limited number of beam angles. Other angles can be handled via interpolation or extrapolation from this limited set.

Under certain circumstances, the basis representation is not unique, that is two pairs of basis material thicknesses, ($t_P$, $t_Q$), and ($t'_P$, $t'_Q$), both give the same (HI, LO). This may occur at low attenuations for unfiltered beams. Beam filtration (for example, the beam may be filtered with 2" of steel) may reduce the ambiguity when two pairs of basis material thicknesses give the same (HI, LO), restricting such ambiguity to cases where P and Q are both relatively high-Z materials. Alternatively, the if low attenuation regions do not occur in the object being inspected or are of no concern for detecting threats, the tables and/or formulae may be fit to other regions and allowed to be inaccurate at low attenuation.

Analytic models, such as MCNP and GEANT, are restricted to positive amounts of basis materials in their calculations. However, (HI, LO) values may occur where the basis representation uses a negative value for one of the basis materials. Extended tables generated from models using purely positive amounts of basis materials may be useful.

The ratio alpha $(\alpha) = t_Q/(t_P + t_Q)$ is a measure of $Z_{eff}$. Creation of mappings between alpha and $Z_{eff}$ (such maps will depend on the choice of basis materials, P and Q) is useful. Additional beam energies may be used such that more that two attenuations are measured for each pixel. Using additional beam energies may help improve material discrimination. For example, in a simple scan of a steel item, the (HI, LO) attenuations could be interpreted as steel or alternatively as a mixture of a high-Z (such as uranium) and low-Z (such as nylon) materials. The latter possibility would result in the issuing of a high-Z alarm. Measurement of the third attenuation could be used to resolve this ambiguity. The third energy may be obtained by some combination of altering the beam energy, filtration and/or detector response. In particular, an energy sensitive detector could be used to make multiple energy attenuation divisions from a single beam. Such a detector could be responsive to single photon events or alternatively segmented in the direction of the beam.

For low energy x-ray imaging, paired detectors may be used. For example, a first detector may be in front of a second detector (such that the second detector is behind the first detector). The first and second detectors may be responsive to different x-ray energies. In some implementations more than two detectors may be located in the same beam path. Various filters can be used, if desired, between detectors. Such a detector is said to be segmented. Each segment can be monitored for response and attenuation values derived from each segment. Segmentation is one of many possible ways for obtaining multiple attentions a technique for obtaining multiple attenuations, although the energy separation in attenuations may not be as distinct as using a single detector with switched beam energy.

Referring to FIG. 1, an example system 100 for examining an inspection volume 105 (or volume 105) that includes items 110A-110C is shown. The system 100 may be used to characterize a material, such as the foreground item 110A, in the presence of an unknown background, such as the item 110B. The item 110A may be represented using a basis function that is selected based on a material property of a region within the item 110A. In some implementations, the basis function may be selected to be a basis function of a material that has an effective atomic number $(Z_{eff})$ that matches the effective atomic number of the material that makes up the background associated with the item 110A. The background associated with the item 110A may be considered to be a localized background of the item 110A. Selecting the basis function to match the effective atomic number of the background allows the item 110A to be characterized, by, for example, estimating the effective atomic number of the item 110A in the presence of the unknown background item 110B.

The volume 105 is examined by exposing the volume 105 to dual-energy radiation from a rapidly switching source 115. The dual-energy radiation includes lower-energy radiation and higher-energy radiation, and the higher-energy radiation has a peak energy in the MeV range (at least 1 MeV). For example, the peak energy of the higher-energy radiation may be above 3 MeV. The higher-energy radiation may be referred to as the HI beam, and the lower-energy radiation may be referred to as the LO beam. The volume 105 may be scanned by the source 115, or the volume 105 may move past the source while the source 115 remains stationary. The volume 105 may include items, materials, objects or other content such as the items 110A-110C. In particular, the volume 105 may include materials of interest, such as hazardous materials, explosives, special nuclear materials (SNM), fissionable materials, materials (such as lead) that may be used to shield nuclear materials, materials that have a particular effective atomic number, or weaponizable materials. The materials of interest may be included in a pre-determined list or database of materials of interest.

Although in the example shown in FIG. 1, the inspection volume 105 is a truck, the inspection volume may be another type of volume, object, space, or region. In some examples, the inspection volume 105 may be a self-propelled, discrete object that arrives at the system 100 for examination. For example, trucks, train cars, automobiles, towed baggage containers, or livestock that pass through a gate or other inspection point and be examined by the system 100. Scans also may be performed on inspection volumes that are objects such as discrete parcels of luggage, mail, or packages, or on volumes being transported on a conveyor system. In some examples, the inspection volume may be a portion of a continuous flow of a material, for example, a flow of food, recycled objects or mining ore moving through a checkpoint or machine for inspection or sorting. The scans may be performed to monitor items, such as boats, transported by waterways or to monitor a liquid and/or gaseous flow. Such scans may be used for inspection of boats passing a channel, floating lumber, pipeline contents, or industrial effluents. The volume 105 may be stationary and scanned by a moving source.

An example of a use for the inspection system 100, or an inspection system similar to the system 100, is the identification of contraband material in cargo. This includes identifying high-Z material in a background of more commonplace, and typically innocuous, materials. For example, a uranium object may be embedded in a background of bottled water and aluminum cans. Such a high-Z material could possibly be shielding radioactive material or might itself be radioactive or fissionable. Other possibilities of contraband (or hazardous) material include high-Z material smuggled as precious contraband, for example, gold or platinum, or their presence in mining ore, or in inspections to reject lead or cadmium batteries in recycling operations. Low-Z contraband such as explosive material in cargo may be identified in part by determining the effective atomic number of suspected items.

The techniques discussed below allow a region within the inspection volume 105 to be decomposed into (represented by) two basis functions. One or both of the two basis functions is derived based on a property, such as an attenuation characteristic of the region of the inspection volume 105. The attenuation characteristic may be an x-ray attenuation property, and/or an attenuation of photon energy. The region of the inspection volume 105 may be a region within an item of interest within the inspection volume 105, a region within a localized background that is associated with an item of interest, or a region that includes both an item of interest and an associated localized background.

Figure 2:
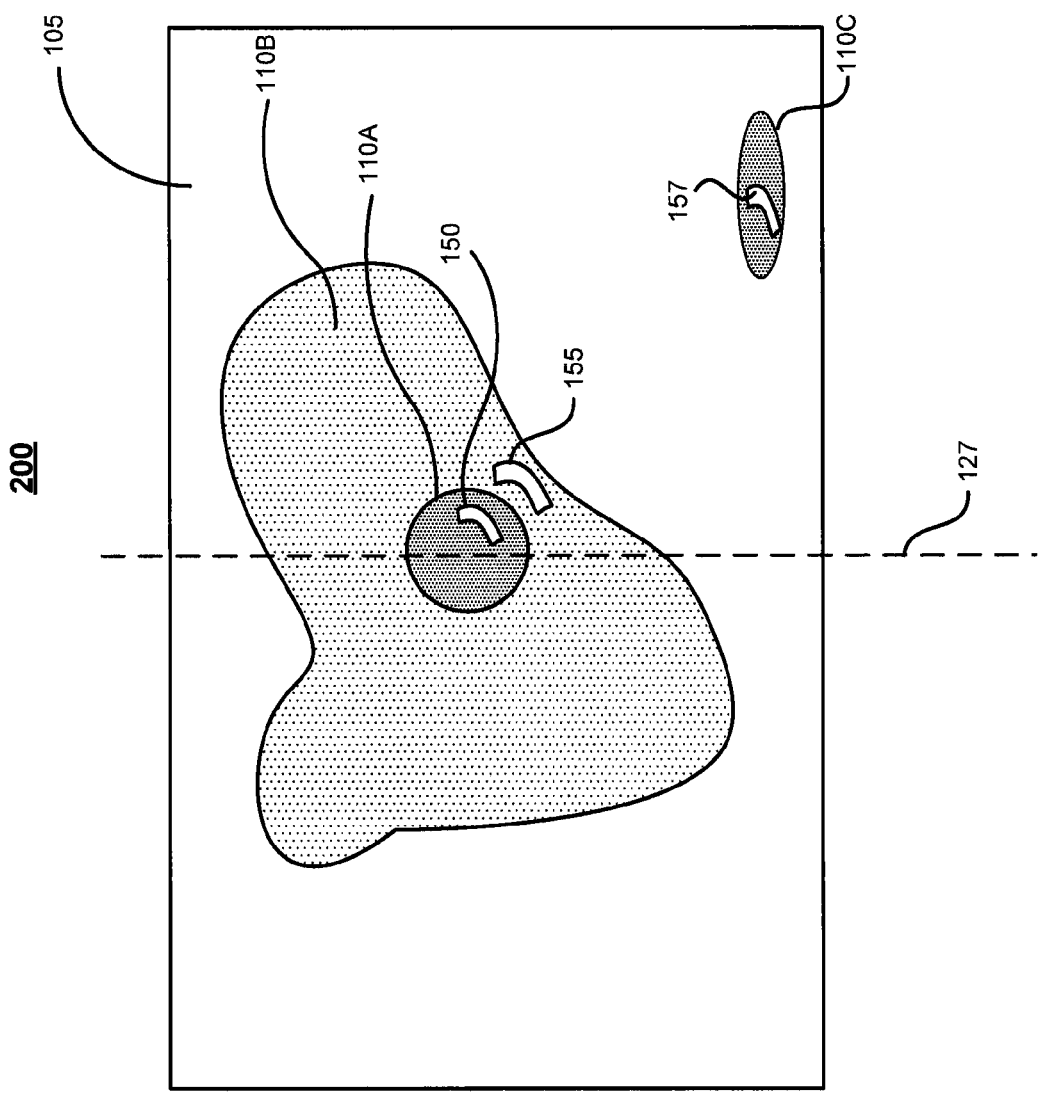
FIG. 2 is a projection image of an inspection volume produced by data from the inspection system of FIG. 1.

During inspection, the volume 105 is exposed to dual-energy radiation from a source 115. The source 115 produces a lower-energy radiation beam and a higher-energy radiation beam. The higher-energy radiation beam includes radiation having an energy in the MeV range, and, in some implementations, the lower-energy radiation beam also includes radiation having an energy in the MeV range. The source 115 scans the volume 105 with the lower-energy beam and the higher-energy beam in order to produce a projection image of the inspection volume 105. Referring also to FIG. 2, an example projection image 200 of the volume 105 is shown. The projection image 200 is discussed in greater detail below.

Radiation from the source 115 enters the volume 105, is attenuated by the surface of the volume 105 and the contents of the volume 105 (such as the items 110A-110C) as the radiation travels through the volume 105, and the attenuated radiation is detected by a detector system 120. An item within the volume 105 may be overlayed (covered) by another item or a background material and/or the item may be underlayed (covering) another item or a background material. The item may be considered to coincide with the background material. In the example of FIG. 1, the item 110A is a foreground item that overlays a background item 110B.

The beam from the source 115 illuminates a beam plane 125 that intersects the inspection volume 107 at a portion 127. Radiation in the beam passes through the foreground item 110A and the background item 110B. The beam plane 125 includes many beam paths along which radiation travels through the inspection volume 105 from the source 115 to the detector system 120. For example, radiation from the source 115 travels along a beam path 130, through the items 110A and 110B and is detected by the detector system 120. A projection of the radiation transmitted along each beam path through the volume 105 onto a surface of the detector system 120 may be considered to be a pixel. Thus, the signal at a pixel corresponding to the beam path 130 includes attenuations caused by the foreground item 110A and the background item 110B. The inspection volume also includes the item 110C, which is not associated with a localized background. When the dual-energy radiation beam from the source 115 passes through the portion of the inspection volume 105 that includes the item 110C, the signal detected by the detector system 120 includes attenuation caused by the item 110C alone.

As discussed in greater detail below, the incremental change in attenuation caused by the presence of the foreground item 110A may be used to determine a property, such as $Z_{\mathit{eff}}$, of the foreground item 110A. The property may be used to determine whether the foreground item 110A includes a material of interest, such as nuclear material, fissionable material, hazardous material, or a material used to shield nuclear materials. A basis function is selected to represent the foreground item 110A based on a property of a region within the foreground item 110A. The foreground item 110A is associated with a localized background that occurs due to the presence of the background item 110B. In some implementations, the region within the foreground item 110A from which the basis function is derived includes the background item 110B. In these implementations, the basis function is selected based on a property of the background item 110B. For example, the basis function may be selected to be a representation of a material that has the same, or a similar, effective atomic number as the background material 110B.

Referring to FIG. 2, an example projection image 200 of the volume 105 is shown. The projection image 200 is a two-dimensional representation of the volume 105, and the projection image 200 may be generated by scanning the volume 105 with the source 115. The projection image 200 is a representation of the attenuation of the radiation from the source 115 caused by the radiation passing through all of the items in the path of the radiation. For example, the portion 127 of the volume 105 is represented in a line of pixels. The projection image 200 may be an attenuation image of the volume 105 made from passing the lower-energy radiation beam through the volume 105 (a LO image), from passing the higher-energy radiation beam through the volume 105 (a HI image), or the image 200 may be a dual-pixel image that combines the LO and the HI image on a pixel-by-pixel basis. The dual-pixel image may be an image that has two values associated with each pixel. One of the values represents the attenuation of the lower-energy radiation along a beam path through the inspection volume 105 and the other pixel value represents the attenuation of the higher-energy radiation along the same beam path.

The HI and LO pixel values in the dual-pixel image correspond, respectively, to measured beam attenuation caused by the portion of the inspection volume 105 through which the lower-energy radiation and higher-energy radiation beams pass. Beam attenuation refers to the reduction in measured beam strength (for example, beam flux or photon intensity) with a target material present in the beam as compared to measured beam strength with the target material not present in the beam. The ratio of the measured beam strength with the target material present to the measured beam strength without the target material present may be used as a measure of attenuation. The logarithm of this ratio also may be used as the measure of attenuation.

The projection image 200 shows a projection of the background item 110B and a projection of the foreground item 110A. As seen in the image 200, the foreground item 110A appears embedded in the background item 110B. In order to characterize the foreground item 110A from the background item 110B, a basis function that is derived from a property associated with a background region 155 is selected. A region 150 is selected within the projection of the foreground item 110A, and a region 155 is selected within the projection of the background item 110B. The region 155 is selected to be relatively near the projection of the foreground item 110A and the region 150. The projection image 200 also may include a projection of the item 110C, which is an item that has little to no background.

The foreground item 110A may be identified in the image 200 by, for example, analyzing the image 200 to locate regions of high attenuation and/or of certain HI/LO ratios, which indicate the presence of a material having a high effective atomic number. The amount of attenuation that the foreground item 110A causes may indicate that the item 110A is an item of interest because many hazardous materials, such as uranium, have high effective atomic numbers. Regions of high attenuation appear dark in the image 200. In the example shown in FIG. 2, the foreground item 110A appears darker than the surrounding background. Additionally or alternatively, items of interest may be identified and selected based on features such as size, shape, and/or location within the volume 105.

Figure 3:
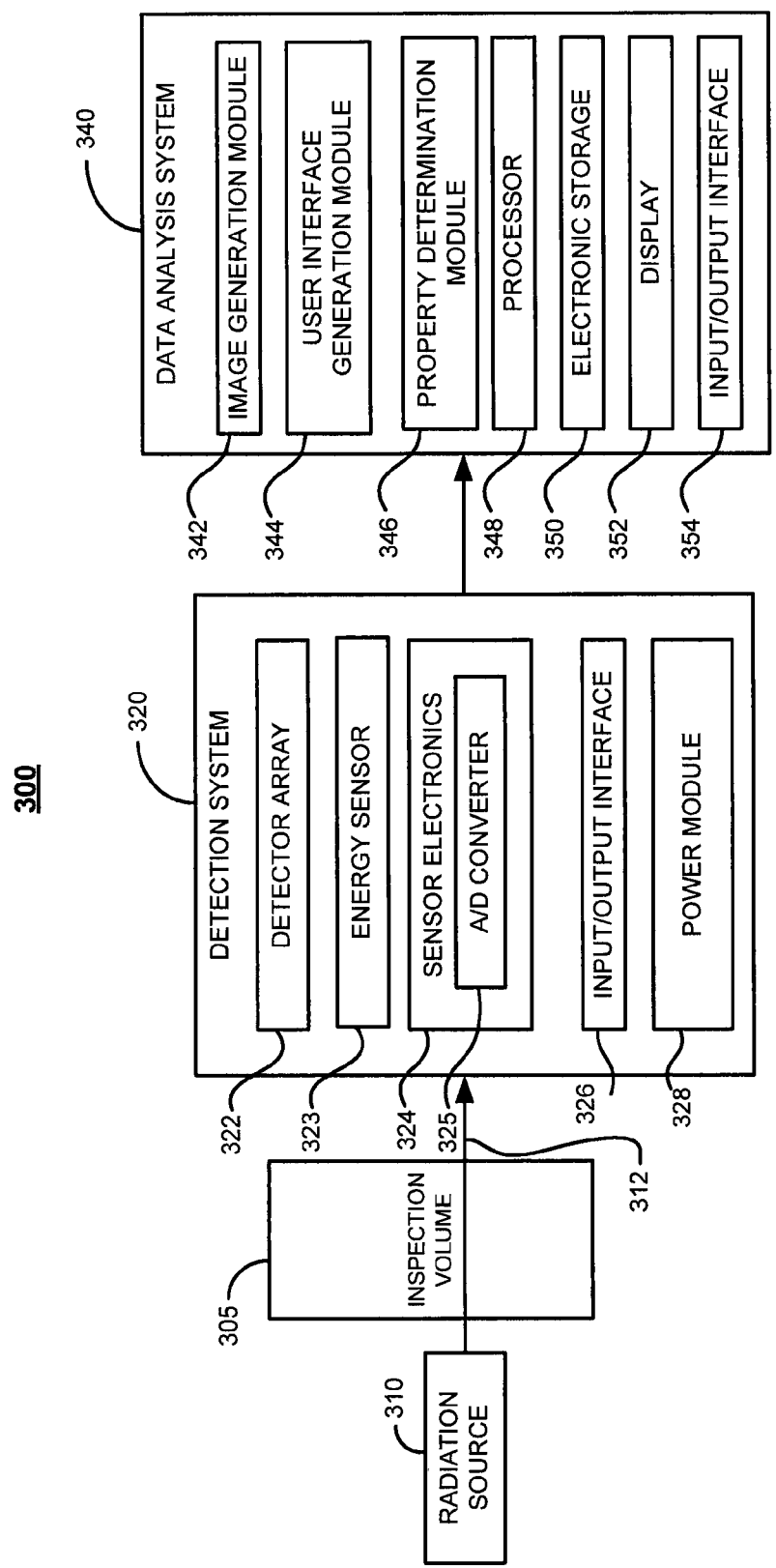
FIG. 3 is a block diagram of an example inspection system.

Referring to FIG. 3, a block diagram of an example system 300 for examining an inspection volume 305 is shown. The system 300 includes a radiation source 310 that exposes the inspection volume 305 to dual-energy radiation, and a detection system 320 that senses radiation from the inspection volume 305. The system 300 also includes a data analysis system 340 that is configured to receive and analyze data from the detection system 320. The data analysis system 340 includes a property determination module 346 that selects a basis function that is derived from a property of a region of the inspection volume 305.

The inspection volume 305 may be a volume similar to the volume 105 discussed above with respect to FIG. 1. The inspection volume 305 may be a containerized volume that is partially or completely enclosed by a well-defined structure that may be rigid. For example, the inspection volume 305 may be a shipping container, a rail car, or a cargo portion of a truck. In these examples, the inspection volume 305 may have a thick-walled surface that is penetrable by MeV range radiation produced by the radiation source 310. Thicknesses for imaging with MeV range radiation range up to, for example, three hundred $gm/cm^2$. In some examples, the inspection volume 305 may be a region, volume, or space that is not enclosed in a well-defined container. For example, the inspection volume 305 may be a portion of a cargo hold of a ship that is located in a body of water.

The radiation source 310 exposes the inspection volume 305 to multi-level radiation, which in this example is the dual-energy radiation 312. The dual-energy radiation 312 includes two energy distributions, or spectra, that each have a peak energy. However, the radiation source 310 may produce multi-energy radiation that includes more than two energy spectra.

The dual-energy radiation 312 includes lower-energy radiation (LO) and higher-energy radiation (HI). The lower-energy radiation may be referred to as a LO beam, and the higher-energy radiation may be referred to as a HI beam. The lower-energy radiation and the higher-energy radiation may be broadband radiation defined by an energy spectrum and a peak energy (or endpoint energy), with the peak energy of the higher-energy radiation being in the MeV range (above 1 MeV). For example, the peak energy of the higher-energy radiation may be between five MeV and nine MeV, and the lower-energy radiation may be about 40 to 70% of the peak energy of the higher-energy radiation. In some examples, the peak energy of the lower-energy radiation is below the MeV range. In some examples, the higher-energy radiation and/or the lower-energy radiation may be monochromatic, or nearly monochromatic.

The source 310 may be a Linac that switches rapidly between two energy settings, an energy setting that produces the lower-energy radiation and an energy setting that produces the higher-energy radiation. In some implementations, the source 310 includes two separate sources of radiation, one of which produces the lower-energy radiation and the other of which produces the higher-energy radiation.

The HI and LO radiation propagates from the source 310 and penetrates the inspection volume 305, where the HI and LO radiation is attenuated while passing through the inspection volume 305 and any contents of the inspection volume 305 that are in the path of the beam 312. HI and LO radiation that emerges from the inspection volume 305 is sensed by a detector included in the detector system 320. The detector system 320 includes a detector array 322, and energy sensor 323, sensor electronics 324, an input/output interface 326, and a power module 328.

The detector array 322 may be a linear array of active elements (such as scintillators) that are sensitive to the energies included in the HI and LO radiation and that are arranged in a particular orientation with respect to the inspection volume 305. For example and referring to FIG. 1, the detector system 120 is an L-shaped linear array that is arranged vertically with respect to the inspection volume 105, and the signals from the detector system 120 correspond to the pixels falling along the line 127 shown in FIG. 2. In implementations in which the detector system 320 is a linear array, the detector system 320 may be moved relative to the inspection volume 305 and the source 310 to build an image of HI and LO pixels. Such an image may be referred to as a dual-pixel image. In some implementations, the detector array 322 is a two-dimensional matrix of active elements that are sensitive to the energies included in the HI and LO radiation. In some implementations, the detector array 322 includes one active element.

In some implementations, more than two energy beams, mono-chromatic, spectra, or distributions may be used. The energy beams may include x-ray radiation, neutron beams, and/or visible radiation. In these implementations, a multi-pixel image includes a layer of pixels for each energy spectra. Each layer of the multi-pixel image may be considered to be an image, and the pixels of a particular layer are associated with an attenuation of the energy caused by a portion of the inspection volume 305 associate with the pixel. Thus, the pixels of the multi-pixel image have multiple values, and the values are associated with attenuation of the respective energy levels. The multiple pixels of the multi-pixel image are registered such that a pixel in one layer represents substantially the same physical portion of the inspection volume as a corresponding pixel in a different layer. Thus, the multi-pixel image may be considered to be a multi-pixel attenuation image. The multi-pixel attenuation image may be transformed into another multi-pixel image that is derived from a basis function associated with each of the energy spectra.

The energy sensor 323 is a sensor that is sensitive to different types of energy as compared to the detector array 322. For example, the energy sensor 323 may be a camera or other type of detector that is sensitive to visible or infrared radiation and provides an image of the inspection volume 305 that may be displayed to an operator of the system 300. In another example, the energy sensor 323 may be a sensor that is sensitive to neutrons or particles produced by fission. The energy sensor 323 may be positioned such that the images produced by the energy sensor 323 depict the inspection volume 305 from a different viewpoint than the detector array 322. Thus, the pixels of the image made from the energy sensor 323 do not necessarily correspond to the pixels of an image produced with data from the detector array 322. In some examples, an image made from data sensed by the energy sensor 323 may be from the same perspective as the detector array 322.

The detector system 320 also includes the sensor electronics 324, which receive and process signals sensed by the detectors in the detector array 322. As discussed above, the active element of the detector array may be a scintillator crystal that produces a visible light signal in response to being struck by x-ray radiation. In this example, the light from the scintillator is sensed by a visible light sensor (not shown) in the sensor electronics and converted into an electrical signal having a value that represents the intensity of the sensed x-ray radiation. An A/D converter 325 digitizes the electrical signal. The detector system 320 also includes the input/output interface 326 that allows the detector 320 to send and receive data from the sensor electronics 324 to the data analysis system 340 for further processing and analysis. The detector system 320 also includes a power module 328 that supplies power to the detector array 322, the sensor electronics 324, and the input/output interface 326. In the case of a linear array, data is sampled and read-out at high frequency, and a scan of the inspection volume is built up over time to produce a projection image of the associated data. Use of the term "image" refers either to the associated image data or its graphic display.

The data sensed by the detection system 320 is passed to the data analysis system 340 for further processing and analysis. The data analysis system 340 includes an image generation module 342, a user interface generation module 344, a property determination module 346, a processor 348, an electronic storage 350, a display 352, and an input/output interface 354.

The image generation module 342 generates an image of the inspection volume 305 based on data received from the detection system 320. The image generation module 342 may generate a HI image that shows the attenuation of the higher-energy radiation, a LO image that shows the attenuation of the lower-energy radiation, and a dual-pixel image that combines the data in the HI and LO images. The user interface generation module 344 generates a user interface for display to an operator of the system 300. An example of the user interface is shown and discussed below with respect to FIG. 9. The user interface generated by the user interface module 344 allows an operator of the system 300 to interact with the system 300 and to visualize data collected by the system 300.

The data analysis system 340 also includes the property determination module 346, which determines a property of a region in the dual-pixel image. For example, the property determination module may be used to select a basis function that is derived from a property of a region within the inspection volume 305 and to determine an effective atomic number of a region within the inspection volume 305.

The data analysis system 340 also includes the input/output interface 354. The interface 354 allows the data analysis system 340 to communicate with the detection system 320 to, for example, receive signals from the detection system 320. Additionally, the input/output interface 354 allows the data analysis system 340 to accept data and commands through an interface device such as a mouse or keyboard and to present data through an interface device such as a visual display. The input/output interface 354 may accept commands from a human operator of the system 300 or from an automated process. The electronic storage 350 stores instructions that, when executed, cause the processor 348 to perform operations such as causing the user interface generation module 344 to generate a user interface and display the interface on the display 352.

Although in the example shown in FIG. 3, the data analysis system 340 is a separate component of the system 300 and is in communication with the detection system 320, that is not necessarily the case. In some implementations, the data analysis system 340 is part of the detection system 320.

Figure 4:
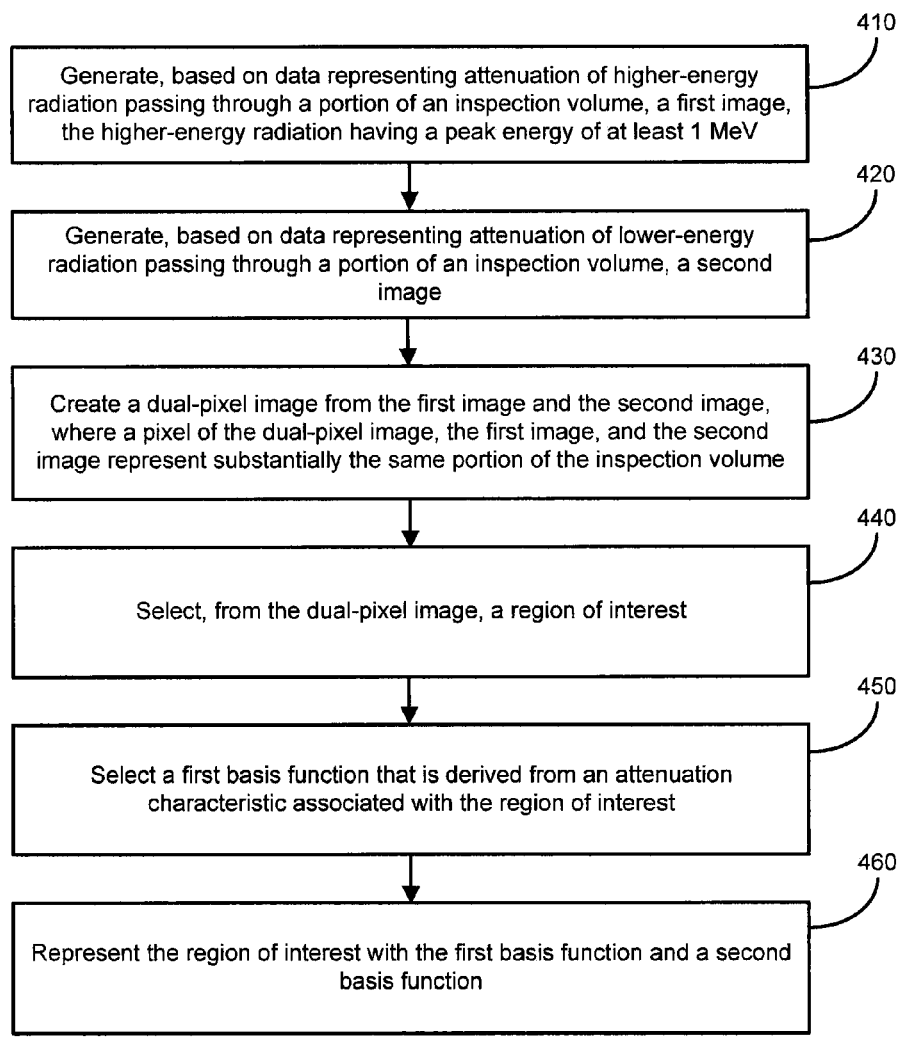
FIG. 4 is a flow chart of an example process for examining an inspection volume.

Referring to FIG. 4, an example process 400 for examining an inspection volume is shown. The example process 400 may be performed by a processor included in a data analysis system such as the data analysis system 340 discussed above.

An image that includes a projection of a portion of an inspection volume is generated (410). The image is generated based on data that represents attenuation of detected higher-energy radiation as the radiation passes through the portion of the inspection volume. The image may be referred to as a HI image or the first image, and the inspection volume may be an inspection volume such as the inspection volume 305 discussed with respect to FIG. 3. The HI image is a projection image of the inspection volume 305, and each pixel in the HI image represents an amount of attenuation of a beam of radiation that travels along a beam path through the inspection volume 305.

An image is generated based on data that represents attenuation of detected lower-energy radiation caused by the lower-energy radiation passing through the portion of the inspection volume (420). This image may be referred to as a LO image or the second image. Similar to the HI image, the LO image is a projection image of the inspection volume, and each pixel in the LO image represents an amount of attenuation of a beam of radiation that travels along a path that corresponds to the pixel. Although in this example the HI image is generated in step 410 and the LO image is generated in step 420, the HI image need not necessarily be generated before the LO image is generated. In addition, although the HI image may be referred to as a "first image" and the LO image may be referred to as a "second image" to distinguish the one image from the other image, the terms "first image" and "second image" are not meant to describe the order in which the images are generated.

A dual-pixel image is created from the first image and the second image (430). Each pixel of the dual-pixel image may be associated with two values, one of which represents attenuation of the LO beam and the other of which represents attenuation of the HI beam. A pixel in the dual-pixel image, the first image, and the second image represent the same portion of the inspection volume. Creation of the dual-pixel image may include registering the HI and LO images such that a pixel in the LO image and a corresponding pixel in the HI image represent the same portion, or substantially the same portion, of the inspection volume. Registration of the images may be accomplished by, for example, aligning fiducials (or other type of reference marker) that have a fixed and known location and appear in both the HI and LO images.

A region of interest is selected from the dual-pixel image (440). The region of interest may be any region of the inspection volume. The region of interest may be within the foreground item 110A, a region within the background item 110B, a region within the item 110C, or a region that corresponds to another portion of the inspection volume. The region of interest may include more than one item. For example, the region of interest may include portions of the foreground item 110A and the background item 110B.

To select the region of interest, the dual-pixel image is analyzed by, for example, segmenting the dual-pixel image to identify possible items of interest (which also may be referred to as targeted regions of interest). For example, an item of interest may be a high-Z material, such as lead, that is used to shield nuclear materials. A high-Z material attenuates x-rays relatively strongly compared to a low-Z material, thus, a high-Z material appears dark in an attenuation image such as the LO image and the HI image. In this example, the dual-pixel image is segmented to locate regions of high attenuation relative to the immediate background of the region. The immediate background may be a localized background that is associated with the foreground item but is not necessarily in contact with the foreground item in real space. Once potential items of interest are located, additional processing may be performed to determine other features, such as size, shape, location within the inspection volume, areal density thickness, and effective atomic number.

Referring again to FIG. 2, for example, the foreground item 110A appears darker than the local background 110B, thus, the foreground item 110A is identified as a possible item of interest. The foreground item 110A is also round, and the round shape may be another indicator that the item 110A is an item of interest. The item 110C does not have an associated background, but the item 110C is located in the lower right portion of the inspection volume 105. In this example, the inspection volume 105 is a truck, and the location of the item 110C in the lower left may indicate that the item 110C is contraband hidden in one of the rear wheel wells of the truck. Because wheel wells are a known hiding place for contraband, the location of the item 110C relative to the inspection volume 105 may provide an additional indication that the item 110C is an item of interest.

The region 150 is within the foreground item 110A, and the region 150 is selected as a region within an item of interest. In some implementations, a region 155 within the localized background 110B is also selected. The region 155 is selected such that the region within the localized background is relatively nearby the foreground item 110A and the region 150. This helps to ensure that the region 155 provides an accurate representation of the background that obscures the foreground item 110A. The background tends to be relatively uniform at or near the edges of the foreground item 110A, thus, selecting a background near the foreground item 110A may ensure that an accurate representation of the background is selected. The region 155 may be referred to as a localized background. The localized background may be approximated as a single type of material with properties (such as thickness and effective atomic number) that are determined.

The presence of the foreground item 110A in addition to the background item 110B results in an incremental increase in the attenuation of the dual-energy radiation as compared to the case where the background item 110B is not overlayed by the foreground item 110A. Thus, properties of the background provide a starting point for associating the incremental attenuation that arises due to the presence of the foreground item 110A. The foreground item 110A has a specific thickness and atomic number composition. The background may be considered to establish an operating point ($HI_B$, $LO_B$), where $HI_B$ and $LO_B$ are, respectively, the attenuation of the higher-energy radiation caused by the background item 110B and the attenuation of the lower-energy radiation caused by the background item 110B. A composite pixel ($M_C$, $LO_C$) of the attenuation of the foreground item with the background may be compared to the background operating point ($HI_B$, $LO_B$). For example, the incremental attenuation ($\Delta HI$, $\Delta LO$) =$LO_C$-$LO_B$) due to the foreground item 110A and/or the ratio $\Delta HI/\Delta LO$ may be determined. Such measures are indicative of the nature and properties of the foreground item 110A that overlays the background item 110B, and, at energies below the MeV range, such measures may produce an accurate estimate of the effective atomic number of the foreground item.

The determination of effective atomic number may be based on a mapping of the HI, LO attenuation data into a basis function representation ($t_P$, $t_Q$), where $t_P$ and $t_Q$ are thicknesses of two basis materials, P and Q, that when stacked together along the direction of beam propagation, produce the same measured attenuation values (HI, LO). Thus, the combination of the material P of thickness $t_P$ and the material Q of thickness $t_Q$ mimics the attenuation behavior of the target material. The thickness of either material may be negative to represent a target material that has an effective atomic number that falls outside of the range of effective atomic numbers included between the effective atomic number of the material P, which is represented by $Z_{eff}(P)$, and the effective atomic number of the material Q, which is represented by $Z_{eff}(Q)$. In some relatively low energy ranges, such as thirty keV to two hundred keV, the ratio of an incremental thickness $\Delta t_P/\Delta t_Q$ caused by the presence of a foreground material overlaying the background typically identifies the $Z_{eff}$ of the target material regardless of the materials that are used for basis P and Q. Thus, in the keV range, two pre-selected and fixed basis materials may generally be used to represent the target material. However, in the MeV range, the basis-decomposition assumptions are not well supported.

Selecting a basis function that represents a material having properties similar to the properties of the actual background material rather than relying on fixed and pre-selected basis functions may allow properties of the foreground item 110A to be determined despite being obscured by an unknown background. Although the composition of the background is initially unknown, the material properties of the background may be estimated from the observed ($HI_B$, $LO_B$) measured in the region 155. Using such a representation, the properties of the foreground item 110A, such as $Z_{eff}$, may be determined.

Returning to FIG. 4, a first basis function that is derived from an attenuation characteristic associated with the region interest (450). The region of interest may be a region in the inspection volume such as the region 150, the region 155, or the region 157 shown in FIG. 2. The attenuation characteristic may be an attenuation of the HI and LO beams caused by the region within the item of interest, and the amount of attenuation of the HI and LO beams may be derived from, or obtained directly from, the values of the pixels of the dual-pixel image that represent the region corresponding to the region of interest. The attenuation characteristic may be, for example, x-ray attenuation properties of the region that describe how strongly the region attenuates x-ray radiation that is incident on the region and/or attenuation of photon intensity.

The region of interest is represented by the first basis function and a second basis function (460). The first basis material and the second basis material may be materials that include a single element, such as copper or uranium. Such materials may be referred to as elemental materials. In some examples, either or both of the first basis material and the second basis material may be a composite of multiple materials.

In some implementations, a property, such as an effective atomic number of the item of interest, may be determined based on the amplitude of the first basis function and the amplitude of the second basis function in the region 150 that is within the foreground item 110A. The first basis function and the second basis function may correspond to a first basis material and a second basis material, and the amplitudes of these basis materials corresponds to the thickness of the basis materials used to mimic the measured attenuation characteristics. A ratio, $\alpha$, which is a ratio of the thickness of the basis materials used to represent the material in the inspection volume, is a measure of $Z_{eff}$. The ratio, $\alpha$, may be expressed as shown in Equation (1)

$$\alpha = \frac{t_Q}{(t_Q + t_P)}, \quad (1)$$

where $t_Q$ is the thickness of the basis material Q (or the amplitude of the basis function that corresponds to the material Q) and $t_P$ is the thickness of the basis material P (or the amplitude of the basis function that corresponds to the material P). The presence of the overlaying item 110A causes an incremental change in the ratio, $\alpha$. As discussed below with respect to FIG. 8, the incremental change in the ratio, $\alpha$, may be used to estimate the effective atomic number of the overlaying material 110A.

Figure 5:
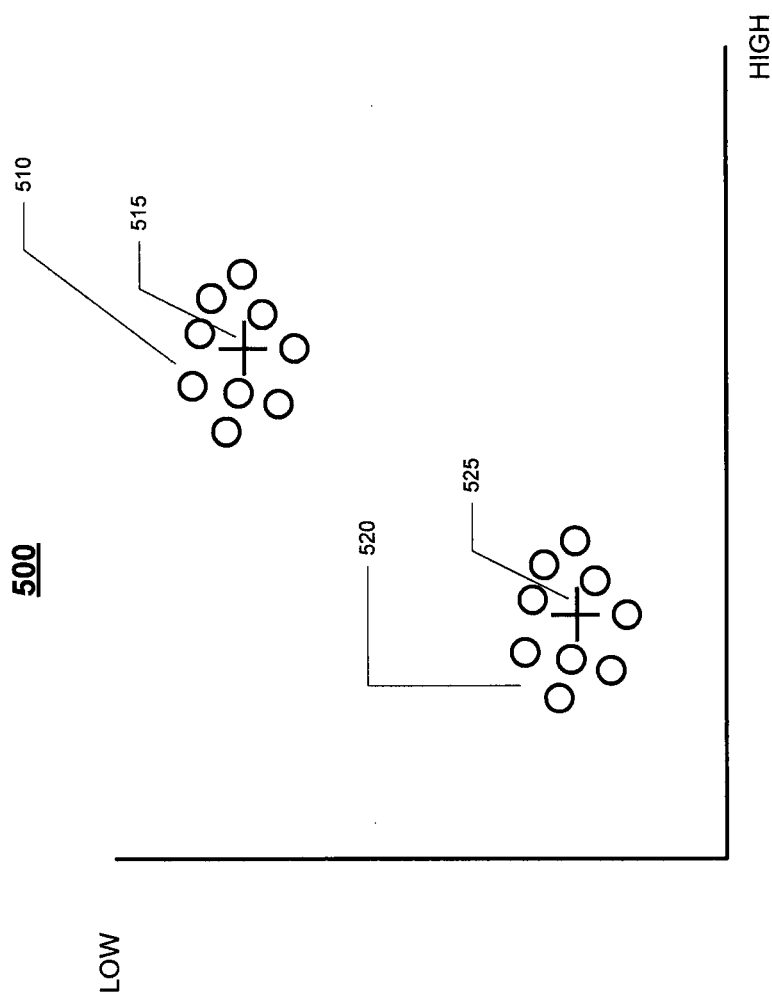
FIG. 5 is an illustration of pixel values taken from a projection image.

Referring to FIGS. 5-8, an example selection of a basis function based on an attenuation characteristic of a region of the projection image 200 of FIG. 2 is shown. FIG. 5 shows an illustration of a scatter plot 500 of measured HI and LO attenuation data for the selected region 150 that is within the foreground item 110A and measured HI and LO data for the selected region of background 155. The HI and LO data may be obtained from the dual-pixel image. In the example shown in FIG. 5, the x-axis represents attenuation values of the HI beam and the y-axis represents attenuation values of the LO beam. As discussed above, the pixel values of the dual-pixel image represent attenuation of the HI beam and the LO beam, and these pixel values may be referred to as a (HI, LO) attenuation pair. The (HI, LO) attenuation pairs for the region 150 are plotted and fall in the area 510 of the plot 500. The centroid 515 of these (HI, LO) attenuation pairs represents the composite attenuation, ($H_C$, $L_C$), that results from the foreground item 110A overlaying the background 110B. The (HI, LO) attenuation pairs 520 for the region of background 155 are also shown on the scatter plot 500. The centroid of these (HI, LO) attenuation pairs represents the attenuation caused by the background and is represented as ($HI_B$, $LOC_B$).

Figure 6:
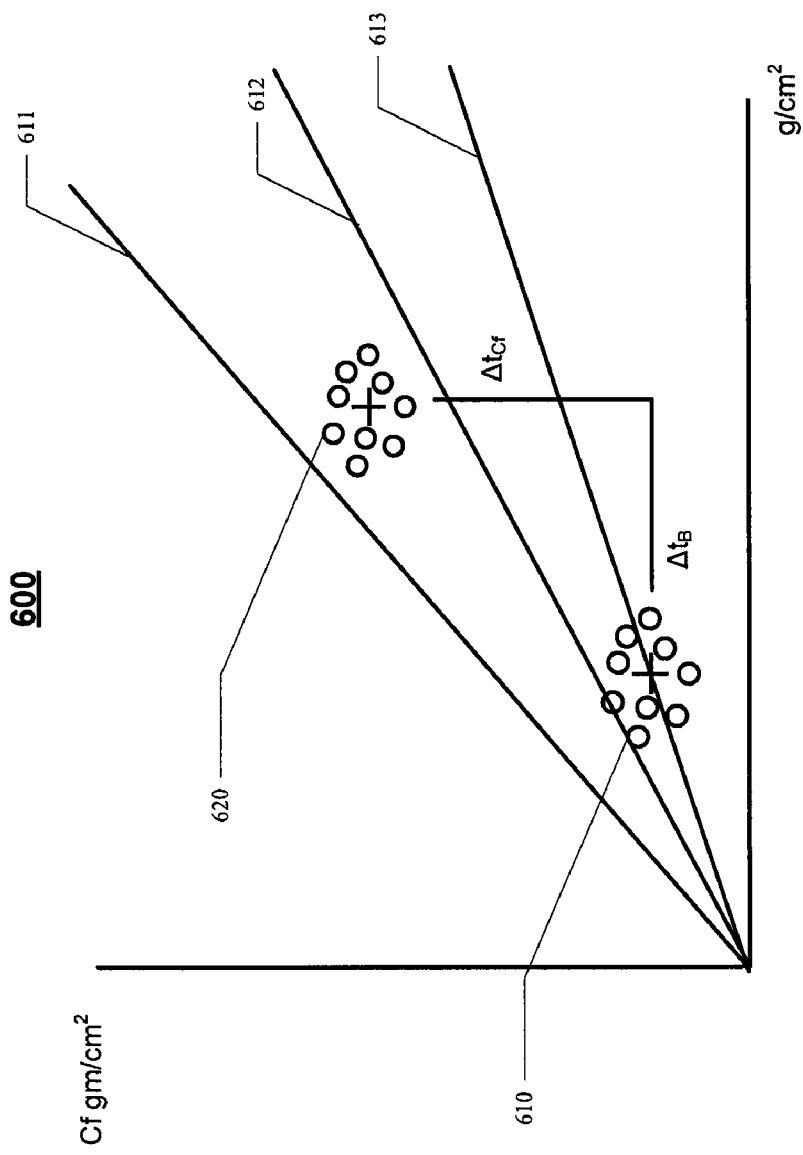
FIG. 6. is an illustration of the pixel values shown in FIG. 5 represented with a boron and californium basis decomposition.

Referring to FIG. 6, a scatter plot 600 is shown. The (HI, LO) attenuation pairs shown in FIG. 5 are transformed into a representation based on two pre-determined basis materials that have effective atomic numbers that span the range of effective atomic numbers of the materials that are expected to be in the inspection volume 105. In the scatter plot 600, the two basis materials are boron (B), which has an effective atomic number of five, and californium (Cf), which has an effective atomic number of ninety-nine. The representation based on thicknesses of boron and californium basis materials is in terms of areal density in units of (g/cm$^2$). A plot of areal density for the background pixels represented with the boron and californium basis functions is shown at 610, and curves 611, 612, and 613 extend from the origin to help determine a material that matches the attenuation properties of the background item. Although in the example shown, the curves 611, 612, and 613 appear to be straight lines, for measurements in the MeV range, the curves 611, 612, and 613 are not necessarily straight lines. The curves 611, 612, and 613 may have a non-zero curvature or otherwise deviate from a straight line.

A plot of areal density for the pixels of the region 150 within the foreground item 110A and the region 155 within the background item 110B is shown at 620. Attenuation properties of the foreground item 110A and the background item 110B may be estimated from the scatter plot 600. In the example shown in FIG. 6, the foreground item 110A is a copper target (or a material with characteristics similar to copper in the MeV range), and the background is a material that includes steel and bottled water. In this example, the curve 613 passes through the centroid 610, and the basis material that best corresponds to this background material is a material that has an effective atomic number between steel and water, and may be a material with effective atomic number of approximately seven and an alpha value of about 0.05. Nitrogen ($Z_{eff}=7$) has similar x-ray attenuation properties to such a material and may be therefore selected to represent the background.

Figure 7:
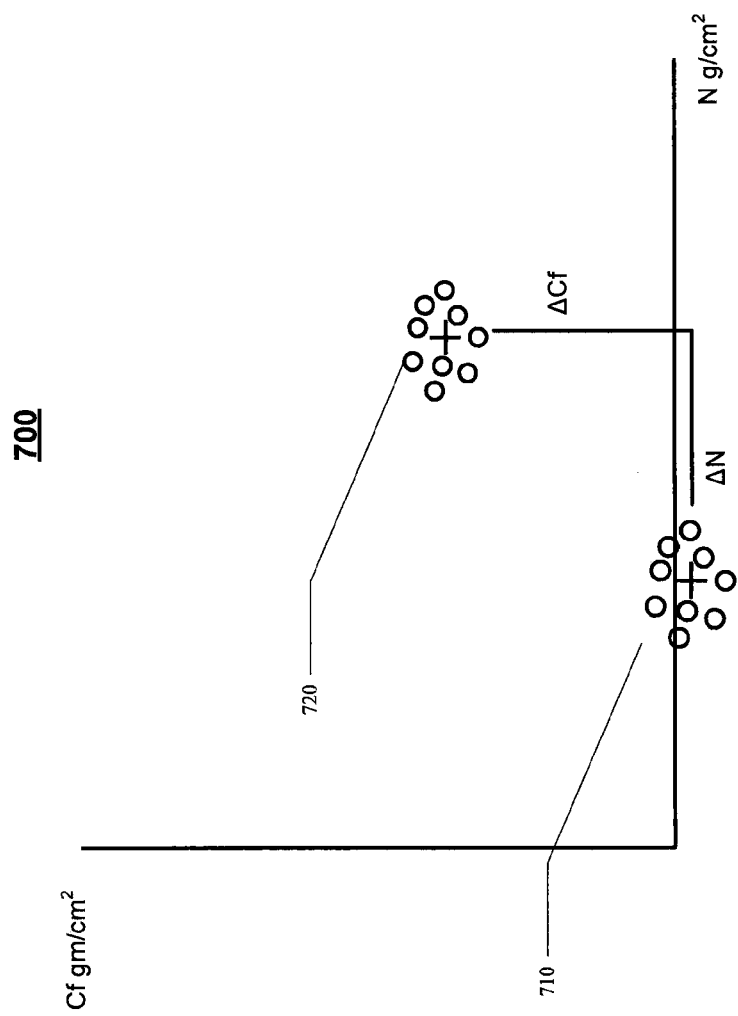
FIG. 7 is an illustration of the pixel values shown in FIG. 6 represented with a nitrogen and californium basis decomposition.

Referring to FIG. 7, an example scatterplot 700 is shown. The data shown in FIG. 6 is recast with a nitrogen, californium basis decomposition. Thus, in FIG. 6, the data was represented using boron and californium as the basis materials, whereas in FIG. 7, the data is represented using nitrogen and californium as the basis materials. In this example, a basis function that represents the background is derived from an attenuation property of a region of the inspection volume and happens to be selected as nitrogen. In particular, the basis function is derived from an attenuation characteristic of the localized region of background 155, and in this example, the selected basis function represents nitrogen. The data points 710 represent the background item, and these points lie on or near the x-axis of the scatter plot 700. The thickness of californium used to represent the background is now zero, or close to zero, because the background is completely represented by the nitrogen basis material. Stated differently, the selected nitrogen basis function fits the background data well by itself without the addition of the californium basis material.

Figure 8:
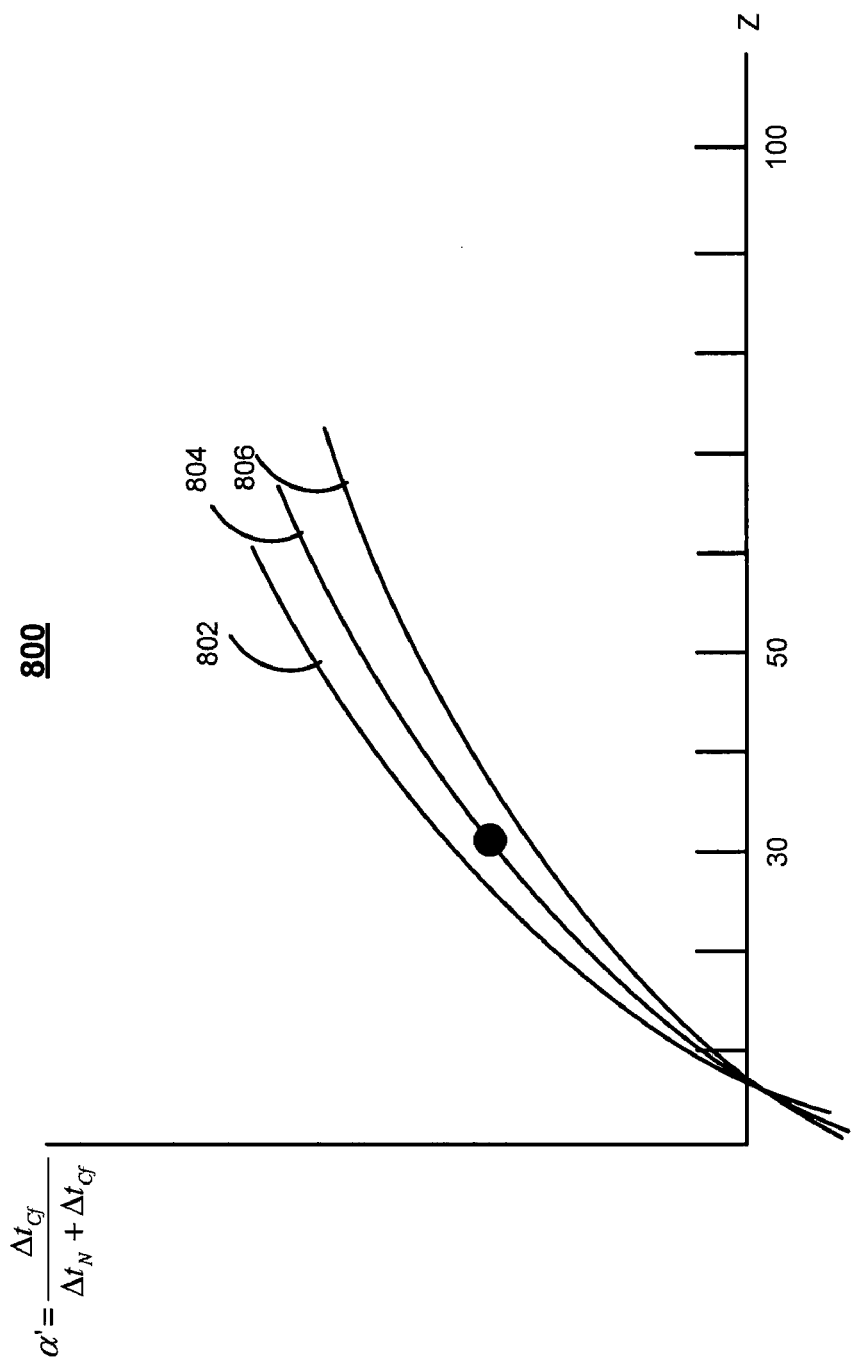
FIG. 8 is an illustration of a family of curves for estimating effective atomic number of a material.

Referring to FIG. 8, a family of curves 802, 804, and 806 that relate an incremental value of alpha ($\alpha$) to effective atomic number. As discussed above, $\alpha$ is a ratio of the thicknesses of the basis materials and the ratio alpha is related to the effective atomic number. The incremental change in the ratio $\alpha$ caused by the presence of the foreground item 110A may be used to estimate the $Z_{eff}$ of the foreground item 110A despite the presence of the background 110B. The incremental value of $\alpha$ is determined as shown in Equation (2):

$$\alpha' = \frac{\Delta t_{Cf}}{\Delta t_N + \Delta t_{Cf}}, \quad (2)$$

where $\Delta t_a$ is the incremental change in the thickness of the californium basis material due to the presence of the overlaying item 110A, and $\Delta t_N$ is the incremental change in the thickness of the nitrogen basis material due to the presence of the overlaying material 110A. The curves 802, 804, and 806 cross the x-axis at the value of the effective atomic number of nitrogen, which is seven. The values of $\Delta t_{Cf}$ and $\Delta t_N$ are shown in FIG. 7 and may be determined from data such as the example data shown in FIG. 7.

The curves 802, 804, and 806 each correspond to relationship between alpha $\alpha$ (using a nitrogen-californium basis decomposition) and the effective atomic number of potential targets. In this example, the curve 802 represents data for a potential target thickness of 10 g/cm$^2$, the curve 804 represents data for a thickness of 30 g/cm$^2$, and the curve 806 represents data for a thickness of 100 g/cm$^2$. The thickness of 10 g/cm$^2$ represents an inspection volume with relatively low density contents, such as an empty truck, and the thickness 100 g/cm$^2$ represents a fairly dense inspection volume. In the example shown, the thickness of the nitrogen and californium basis materials used to represent the actual target material is about 30 g/cm$^2$, thus the curve 804 is used. The value of $\alpha'$ is obtained from the data shown in FIG. 7, and the value of $\alpha'$ is located on the curve 804 to determine the effective atomic number of the overlaying item 110A. As shown, the determined value of $\alpha'$ corresponds to a $Z_{eff}$ of about thirty. Thus, in this example, the overlaying item 110A is determined to have an effective atomic number of about thirty, which is close to the effective atomic number of copper ($Z_{eff}=29$). Accordingly, the overlaying item 110A is likely to be a material, or a composite of multiple materials, that is similar to copper in atomic number. The overlaying material may be, for example, a material that is composed in large part of a material that is near copper in atomic number. Interpolation between the curves 802, 804, and 806 may be used to estimate $Z_{eff}$ for other thicknesses.

Accordingly, a basis function is derived from an attenuation characteristic associated with a region within the inspection volume, and the region of the inspection volume is represented by the derived basis function and a second basis function. In the example shown in FIGS. 5-8, the region within the inspection volume is the region of background 155, and the selected nitrogen basis material, which may be represented by a basis function, is derived from a pair of HI and LO attenuation values measured in the region of background 155. The region of background is represented with the selected nitrogen basis material and the californium basis material. In other examples, the region within the inspection volume may be the region 150, which is within the overlaying item 110A. In some examples, the region within the inspection volume may be a region that includes both the overlaying item 110A and the background item 110B.

In the example shown in FIGS. 5-8, two basis materials are used to represent the materials in the inspection volume. However, in some implementations, more than two basis functions or basis materials may be used. In these implementations, a corresponding number of attenuation measurements are measured for each pixel. Thus, in an implementation that uses three basis functions to represent the materials in the inspection volume, three beams of radiation, each having a different detected spectral energy and possibly peak energy, would irradiate the inspection volume. For example, two of the three beams may have a peak energy in the MeV range, and the third beam may have a peak energy below 1 MeV. In these implementations, the pixels of a combined projection image of the inspection volume are associated with three attenuation values corresponding to the attenuation of each of the three radiation beams.

As compared to implementations that use a HI and a LO beam, using additional beam energies may help improve material discrimination by resolving ambiguities that may arise as a result of using MeV range radiation. For example, in a scan of a steel item, the (HI, LO) attenuations could be interpreted as steel or alternatively as a mixture of a high-Z material such as uranium and a low-Z material such as nylon. The latter possibility would result in the issuing of a high-Z alarm because of the possible presence of a material such as uranium. Measurement of the third attenuation could be used to resolve this ambiguity.

The third beam of radiation may be obtained by some combination of altering the beam energy from the radiation source by, for example, filtration to separate the radiation into three spectral bands, each having a different peak energy and/or by altering the detector response. For example, a segmented or stacked detector may be used to divide the detected radiation into different spectral (or energy) bands. For example, a stacked detector may include detector elements that are penetrable by x-ray radiation and stacked along the direction of beam propagation. Each element of the detector produces a signal corresponding to an amount of photon energy incident on the element, and the depth through the stacked detector that a photon penetrates corresponds to the energy of the photon, with the highest energy photons penetrating further into the detector than the lower energy photons. Thus, like irradiating the inspection volume with different beams of radiation to determine how much the inspection volume attenuates radiation of various spectral energies, the stacked detector itself produces signals that indicate how much the inspection volume attenuates photons of various energies.

Figure 9:
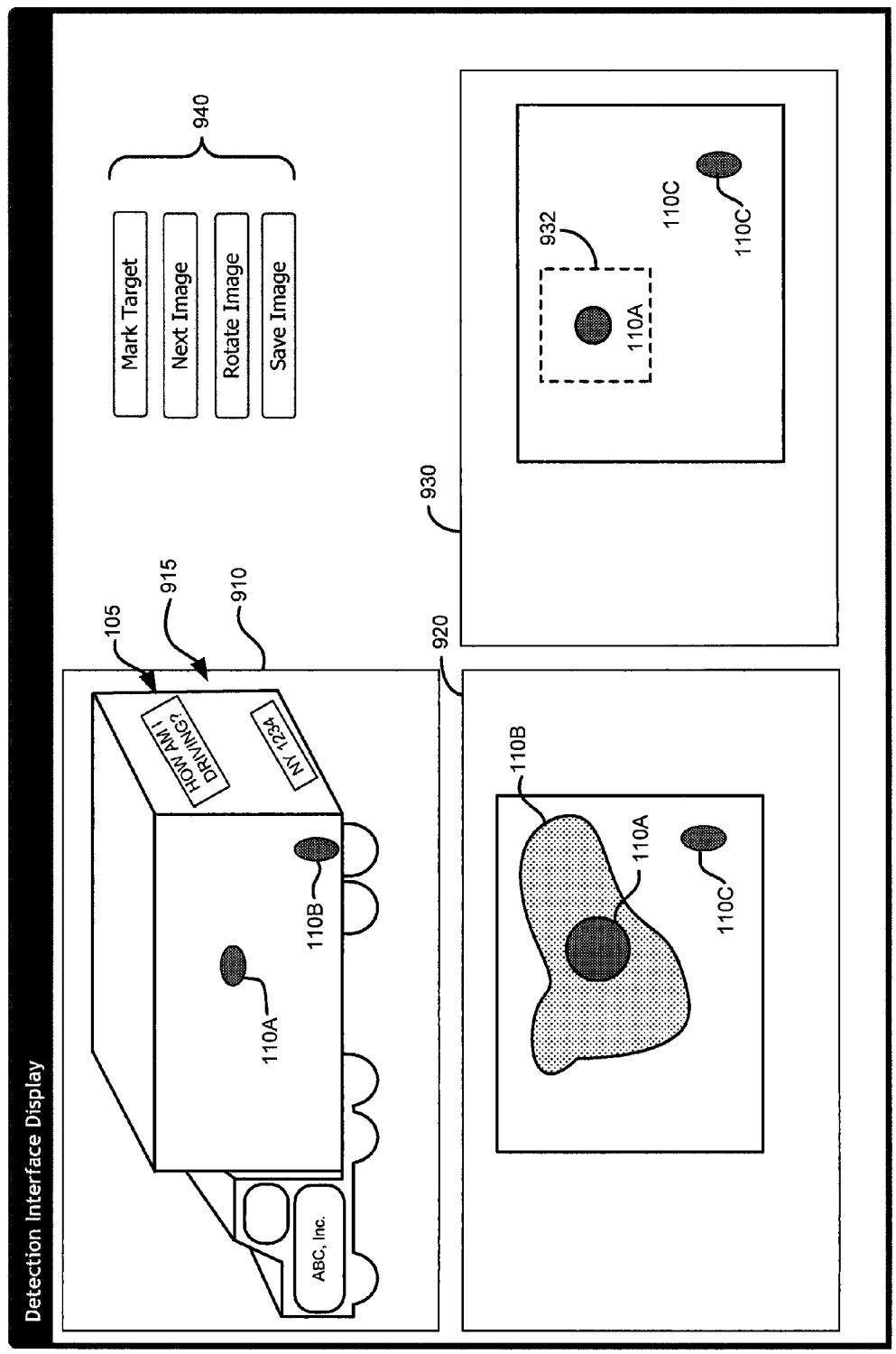
FIG. 9 is an illustration of a visualization tool used in conjunction with an inspection system.

Referring to FIG. 9, an illustration of an example screen from a visualization tool used in conjunction with an inspection system is shown. FIG. 9 shows an example graphical user interface (GUI) 900 that allows an operator of an inspection system such as the inspection system 100 or the inspection system 300 to visualize data captured by the inspection system.

The GUI 900 includes windows 910, 920, and 930 and controls 940. The window 910 shows an image 915 of the inspection volume 105. The image 915 of the inspection volume 105 may be, for example, a photograph of the inspection volume 105 taken with a visible or infrared camera (such as the energy sensor 323 discussed with respect to FIG. 3). The image 915 gives the operator of the inspection system a lifelike view of the inspection volume 105 and provides information that may not be apparent in attenuation images made by exposing the inspection volume 105 to the MeV level radiation. For example, the image 915 is a visible image that includes a the license plate ("NY 1234") of the inspection volume 105, the name of the company ("ABC, Inc.") that owns or operates the inspection volume 105, and a photograph of a sign ("how am I driving?") that is attached to the rear of the inspection volume 105. Displaying the visual image 915 of the inspection volume 105 may allow an operator to readily determine that the inspection volume is a truck that is presumably owned and/or operated by "ABC, Inc." and has a vanity license plate that reads "NY 1234." In the example shown, the items 110A and 110C are superimposed on the image 915 of the inspection volume 105 such that the operator may readily see the locations of possible threat materials relative to the inspection volume 105.

The window 920 shows the projection image 200 of the contents of the inspection volume 105. The projection image 200 is also shown in FIG. 2, and, as discussed with respect to FIG. 2, the projection image 200 is an attenuation image of the inspection volume 105. Thus, in contrast to the photograph 915, the projection image 200 shows how the inspection volume 105 attenuates x-ray radiation. In the example shown in FIG. 9, the window 920 shows the projection image 200 directly below the window 910 such that the operator may get a sense of the relative locations of all of the materials imaged by the MeV range radiation and where the materials are located within the truck.

The window 930 shows the projection image after the background 110B has been identified and removed, or minimized, by selecting a basis function that is derived from an attenuation characteristic of a region within the inspection volume 105. After removal or minimization of the background 110B, the item 110A and the item 110C remain visible and are processed further to determine whether either or both are items of interest. For example, the location of the item 110C within the inspection volume 105 is near the wheels, which may be an indication that the item 110C is contraband hidden in a wheel well of the truck.

In some implementations, the X-ray images may be combined with images obtained with other radiation, such as neutron beams, each imaging modality providing an independent signature of possible materials of interest. For example, neutron beams may be used to interrogate the inspection volume 105, and regions that produce fission products are within the cargo may contain fissionable material, which can be further confirmed or dismissed by evidence from the x-ray image. For example, in some implementations, the inspection volume 105 may be irradiated with a neutron beam of sufficient energy to cause the release of delayed fission products in special nuclear materials. In these implementations, the detection of the delayed fission products in addition to an indication from the x-ray projection images that an item has a high effective atomic number, indicates that the item is likely to be a special nuclear material. In some implementations, the image 910 may be an image of relatively low resolution that is used to determine whether a higher resolution image would aid in the determination of whether the region includes a material of interest.

Items in the window 930 that are materials of interest (such as special nuclear materials) are visually marked so that the operator may readily see items that may require additional, perhaps manual, inspection. In the example shown, the foreground item 110A is material of interest and is marked with the dotted box 932. The item 110C is not a material of interest, thus, the item 110C is not marked. The GUI 900 also includes the controls 940. The controls 940 are buttons that allow the operator to manipulate the content of the windows 910, 920, and 930, save images, and/or advance to the next set of images.

In the example shown in FIG. 9, regions of the inspection volume that include a material of interest are visually marked for the operator of the inspection system by presenting a marker such as the box 932. In other examples, an additional or separate action may be taken as a result of the detection of a material of interest. For example, an audible and/or visual alarm may be activated or the inspection volume may be halted or diverted.

FIGS. 10-14 show additional examples for analyzing data from an inspection system.

Figure 10:
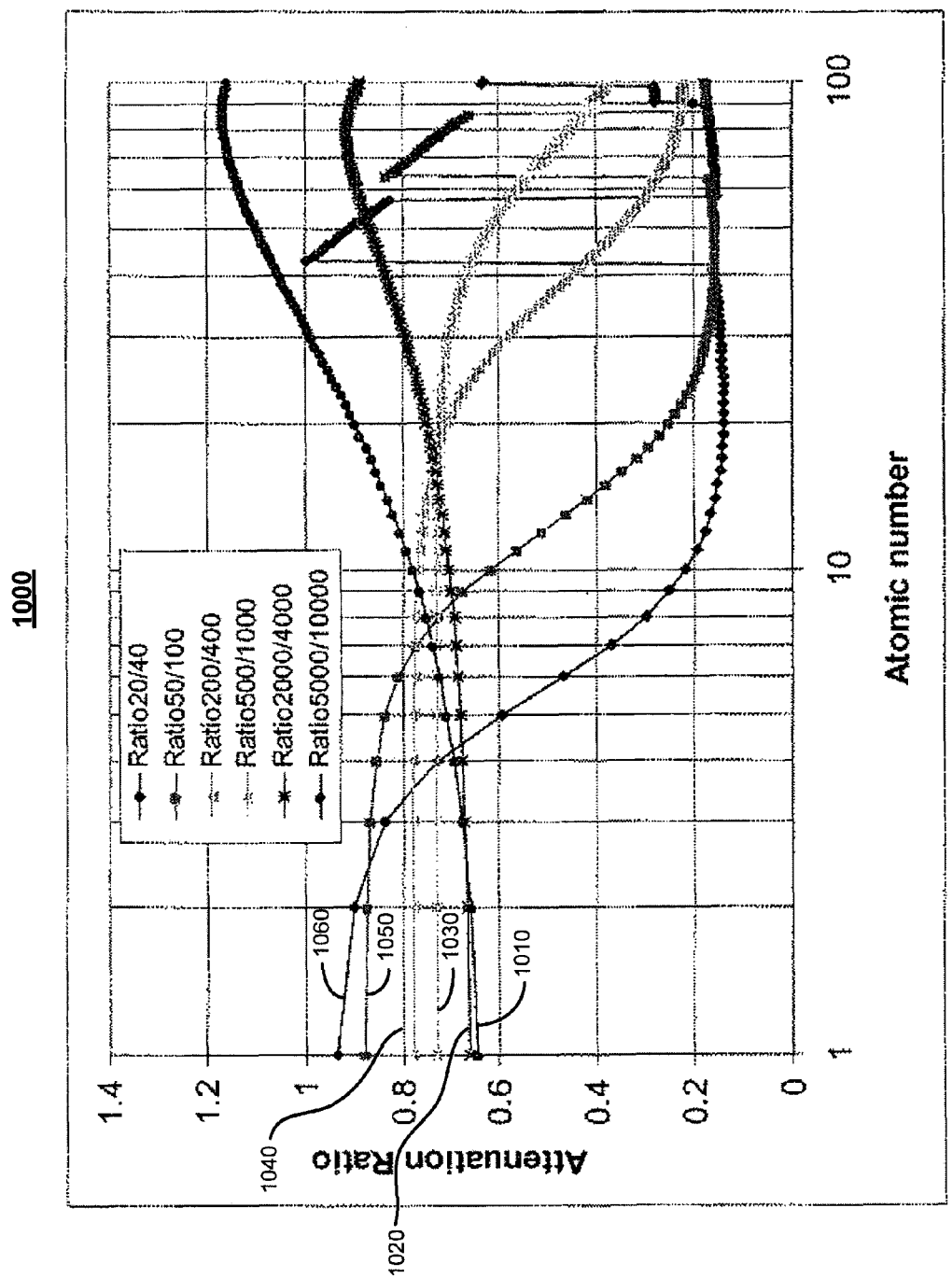
FIG. 10 is an example graph that shows the atomic number dependence of the ratio of attenuation coefficients.

Referring to FIG. 10, an example graph 1000 shows the Z dependence of the ratio of attenuation coefficients of a mono-energetic HI beam and a LO beam having an energy of half of the energy of the HI beam. The graph 1000 may be used to determine or approximate the effective atomic number of a region of an inspection volume given a known energy of the HI and LO beam.

The graph 1000 includes five different mono-energetic HI beam and LO beam combinations. The curve 1060 corresponds to a HI beam having an energy of 40 kEv and a LO beam having an energy of 20 keV, the curve 1050 corresponds to a HI beam having an energy of 100 keV and a LO beam having an energy of 50 keV, the curve 1040 corresponds to a HI beam of 400 kEv and a LO beam of 200 keV, the curve 1030 corresponds to a HI beam of 1 MeV and a LO beam of 500 keV, the curve 1020 corresponds to a HI beam of 4 MeV and a LO beam of 2 MeV, and the curve 1010 corresponds to a HI beam of 10 MeV and a LO beam of 5 MeV.

As shown in the graph 1000, the curves 1010-1060 depend on the energy in the HI beam. With HI energies below 1 MeV, the ratio of attenuation coefficients falls with increasing Z, but above 1 MeV, the ratio rises. However, in either case, the ratio of attenuation coefficients is an approach for determining $Z_{eff}$. For example, as shown on curve 1010, for a ratio of attenuation coefficients equal to one measured as a result of exposing an inspection volume to a HI, LO pair of 10 MeV and 5 MeV, the $Z_{eff}$ of such a target would be approximately 30.

Figure 11A:
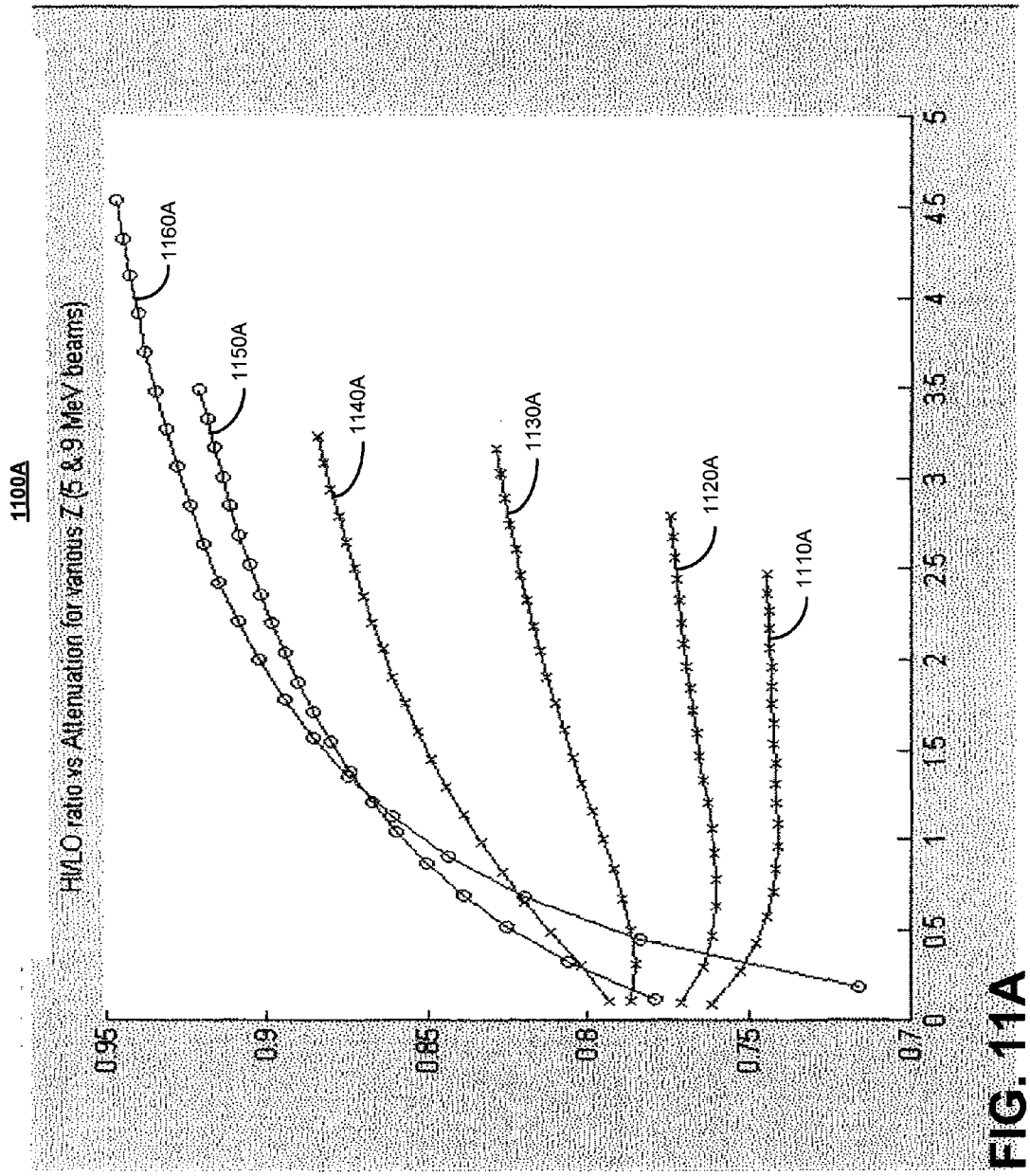
FIGS. 11A-11C are graphs showing a HI, LO ratio using spectra from 5 and 9 MeV beams.

Referring to FIG. 11A, a graph 1100A showing the HI, LO ratio obtained from computed simulations using a Linac energy spectra from 5 and 9 MeV beams at various thickness (g/cm$^2$) of a material through which the HI and LO beams pass. The curves 1110A, 1120A, 1130A, 1140A, 1150A, 1160A represent effective atomic numbers 5, 10, 20, 35, 50, and 100, respectively. The graph 1100 shows how the ratio of the HI and LO beam changes depending on the thickness of the material. Thus, if the thickness of the material and the HI, LO ratio is known, the graph 1100 may be used to determine the type of material. For example, a ratio of 0.8 from a material that is 0.2 g/cm$^2$ in thickness roughly corresponds to a material having an effective atomic number of 20.

Figure 11B:
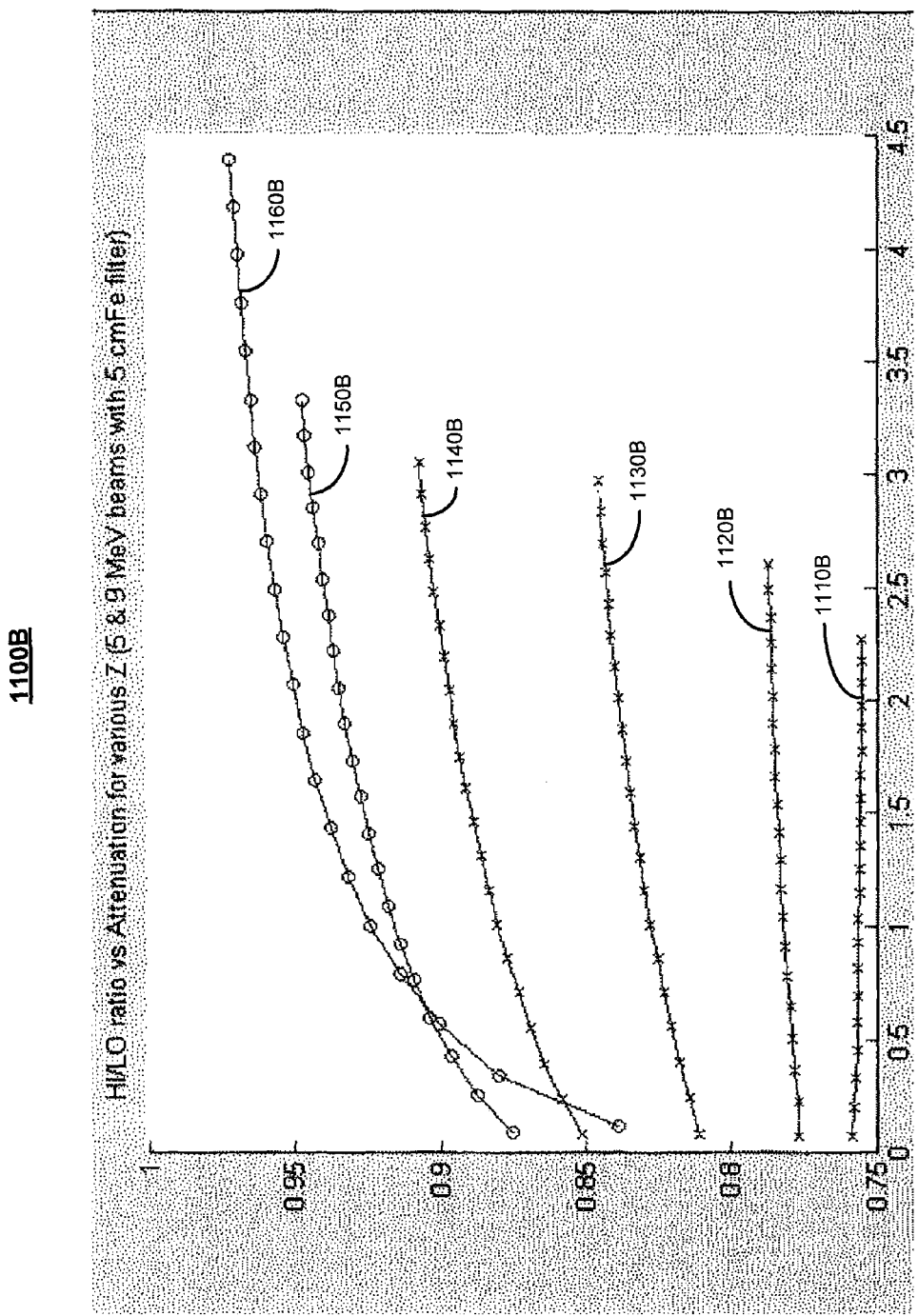

Referring to FIG. 11B, a graph 1100B also shows the HI, LO ratio obtained from computed simulations using a Linac energy spectra from 5 and 9 MeV beams at various thickness (g/cm$^2$) of a material. The curves 1110B, 1120B, 1130B, 1140B, 1150B, 1160B represent effective atomic numbers 5, 10, 20, 35, 50, and 100, respectively. The graph 1100B in FIG. 11B differs from the graph 1100A in that the HI and LO beams are filtered by passing the beams through 5-cm of iron in the simulation. As shown, filtering the beams results in less ambiguity for thinner targets (those targets on the left side of the x-axis, such as those between 0 and 1 g/cm$^2$).

Figure 11C:
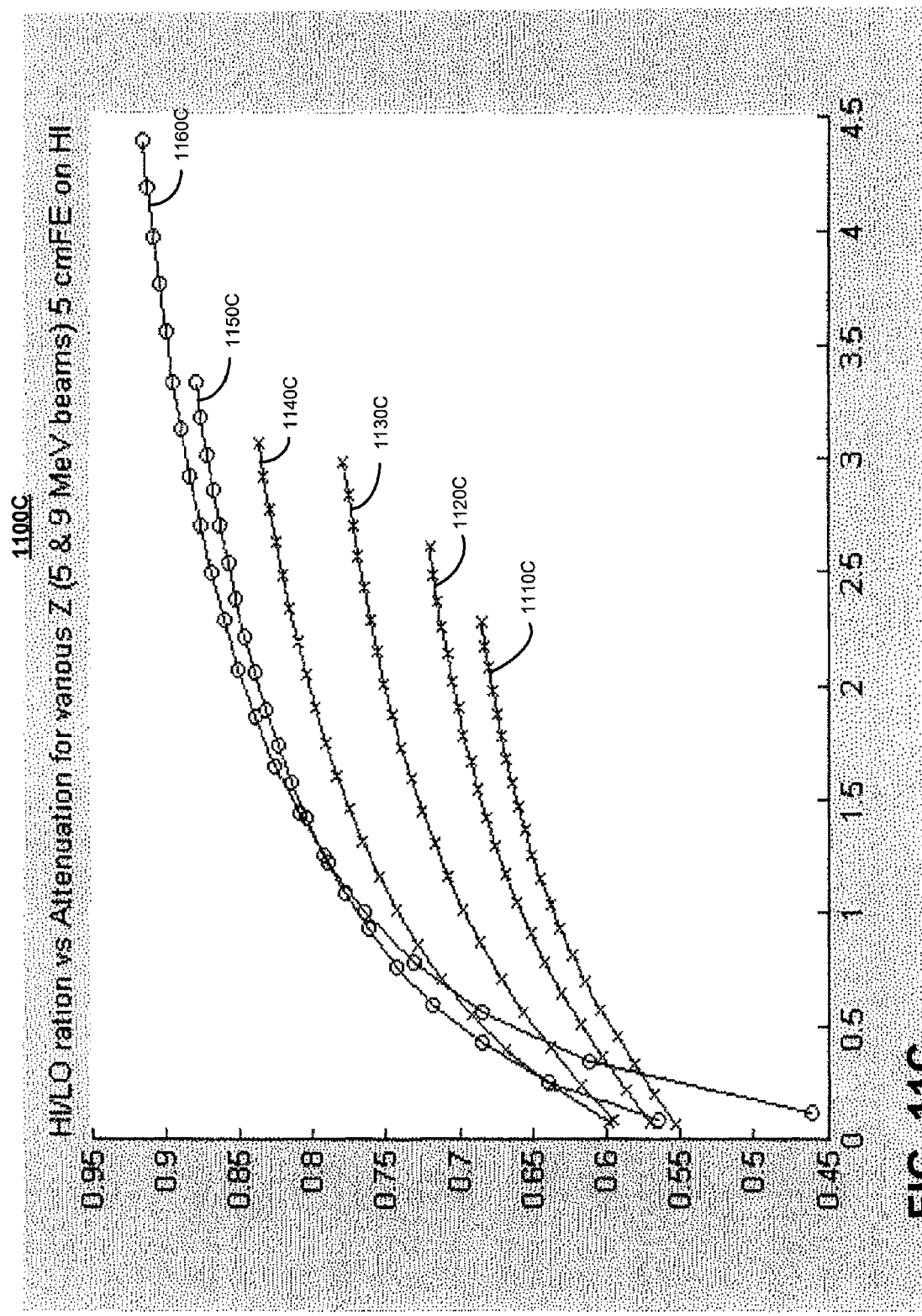

Referring to FIG. 11C, a graph 1100C also shows the HI, LO ratio obtained from computed simulations using a Linac spectra from 5 and 9 MeV beams at various thickness (g/cm$^2$) of a material. The curves 1110C, 1120C, 1130C, 1140C, 1150C, 1160C represent effective atomic numbers 5, 10, 20, 35, 50, and 100, respectively. The graph 1100C differs from the graph 1100B in that only the HI beam (and not the LO beam is filtered by passing the beam through 5-cm of iron.

Figure 12:
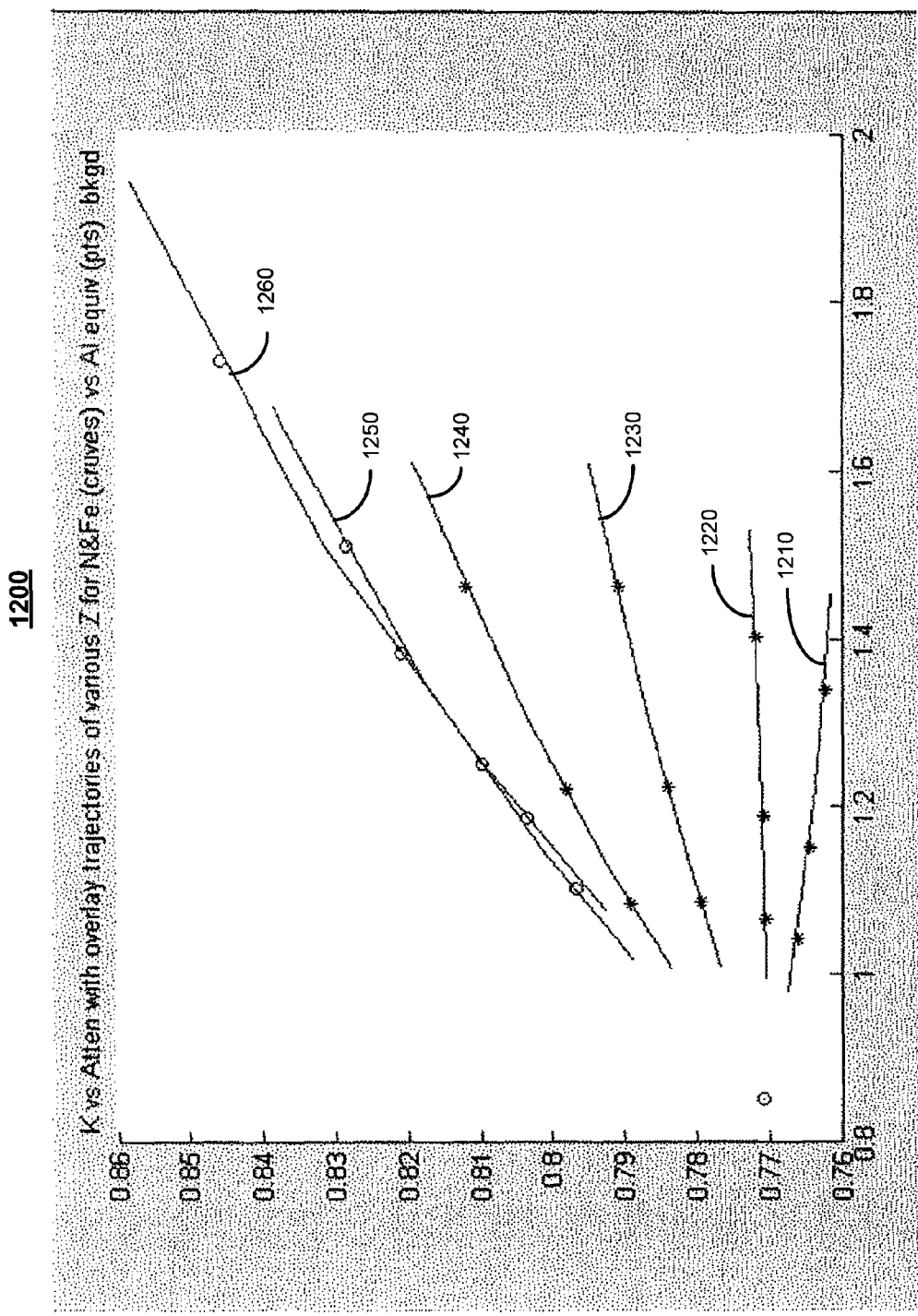
FIG. 12 is a graph of attenuations of various overlaying target materials added to nitrogen iron basis materials.

Referring to FIG. 12, a graph 1200 shows a simulation performed with 5 and 9 MeV beams filtered by 5 cm of iron using basis materials of nitrogen of thickness 32.42 g/cm$^2$ plus iron (Fe) 16.814 g/cm$^2$ to substitute for 50 g/cm$^2$ of aluminum (Al). The x-axis of the graph 1200 is the HI-beam attenuation. The basis materials are designed to give the same attenuations as aluminum, so the HI, LO ratio is 0.771 for both. Various overlaying targets are added, the curves 1210, 1220, 1230, 1240, 1250, 1260 representing addition of material of Z=5, 10, 20, 35, 50 and 100, respectively, in a range of thicknesses in addition to the N—Fe basis materials. The points represent addition of material of Z=5, 10, 20, 35, 50 and 100 in a three discrete thicknesses in addition to the original aluminum material. Note that the substitution of the basis material for the original aluminum target produces no discernable difference.

Figure 13:
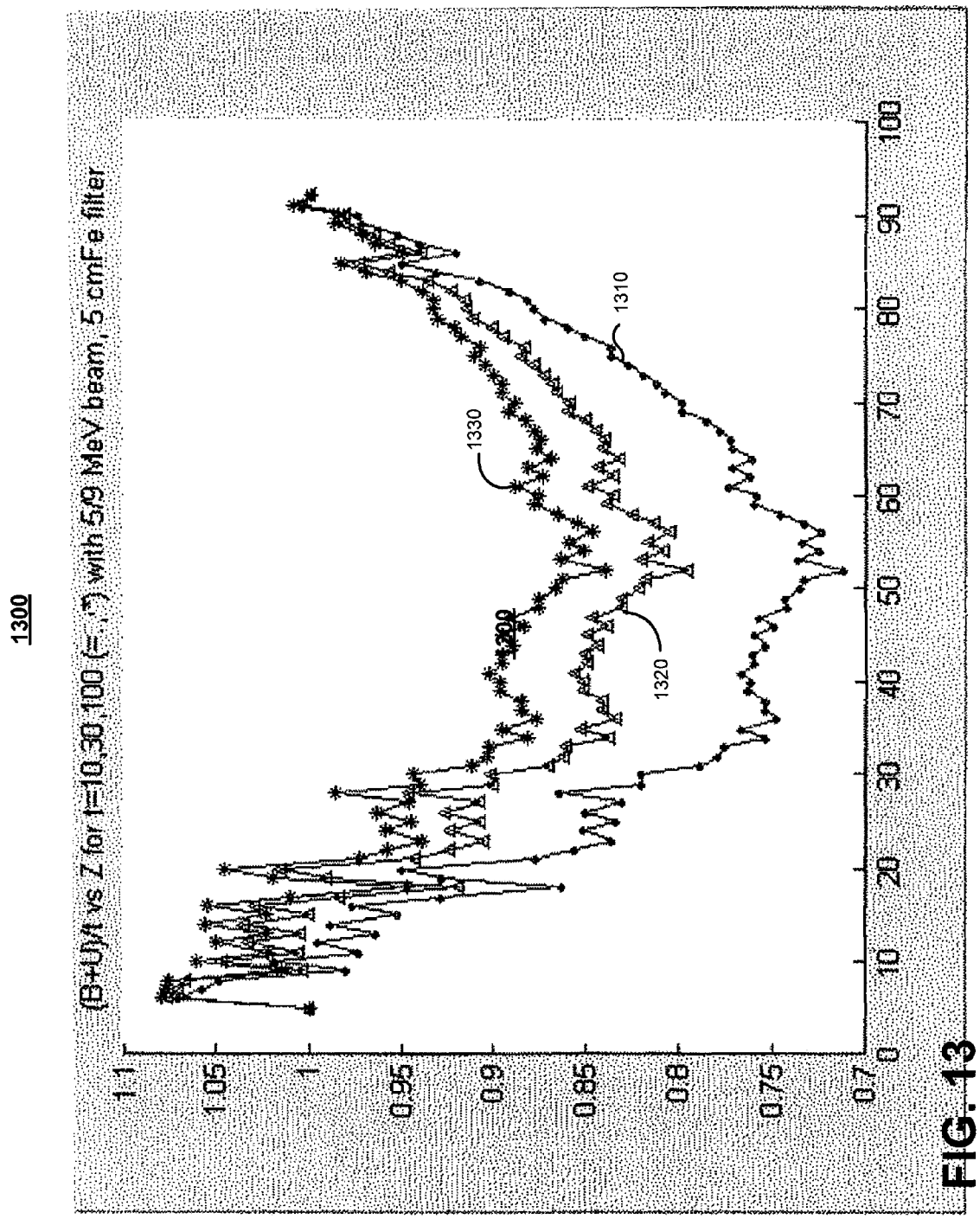
FIG. 13 is a graph of a ratio of the thickness of basis materials of boron and uranium to the thickness of an original material.

Referring to FIG. 13, a graph 1300 shows a simulation with 5 and 9 MeV beams filtered by 5 cm of iron using the basis materials boron and uranium in place of actual thickness, t, (in g/cm$^2$) of elemental material from Z=5 to 92. Three thicknesses, 10, 30 and 100 g/cm$^2$, are shown in curves 1310, 1320, and 1330, respectively. The ratio of basis material thickness $(t_B+t_U)/t$ is compared to the original material thickness in terms of a ratio. The ratio is generally close to 1, but ranges as high as 1.08 and as low as 0.71 in the example shown. Thus, especially for non-thin targets, the combined thickness of the basis materials may provide a reasonable estimate of the original material's thickness. If necessary, the curves allow an improved thickness estimation once the target's atomic number is estimated.

Figure 14:
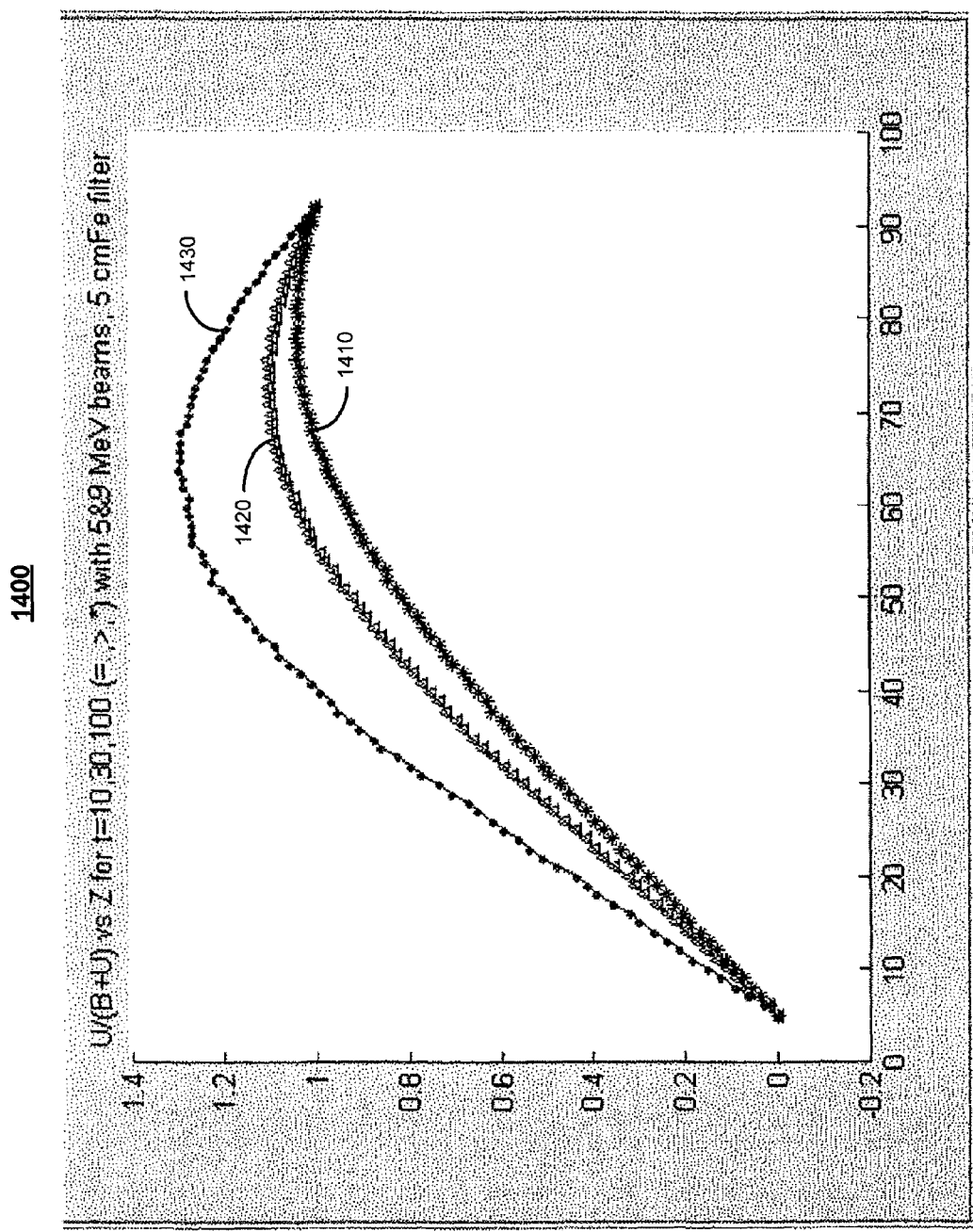
FIG. 14 is a graph of a ratio of the alpha ratio of basis materials of boron and uranium.

Referring to FIG. 14, a graph 1400 shows a simulation with 5 and 9 MeV beams filtered by 5 cm of iron using the basis materials boron and uranium in place of actual thicknesses (in g/cm$^2$) of elemental material from Z=5 to 92. Three thickness, 10, 30 and 100 g/cm$^2$, are shown, respectively, with curves 1410, 1420, and 1430. The alpha ratio, $t_U/(t_B+t_U)$, is computed and is seen to be a fairly good indicator of the original material's atomic number. The dependence on target thickness is visible as the separation between the curves. For a particular pixel the thickness is fairly accurately known. In using alpha to infer Z, one of the curves, 1410, 1420 or 1430, appropriate for the target's estimated thickness may be used or an interpolation between such precomputed curves may be used. Some ambiguity (double valuedness) occurs at high Z, although the effect is most severe at light attenuations.

A number of implementations have been described. Nonetheless, other implementations are within the scope of the claims. For example, both the HI and LO beams may have peak energies below 1 MeV.

What is claimed is:
1. A method for examining an inspection volume, the method comprising:
generating, based on data representing attenuation of higher-energy radiation having a peak energy of at least 1 MeV passing through a portion of an inspection volume, a first image including a projection of the portion;
generating, based on data representing attenuation of lower-energy radiation passing through the portion of the inspection volume, a second image including a projection of the portion;
creating a dual-pixel image from the first image and the second image, wherein a pixel of the dual-pixel image, a pixel of the first image, and a pixel of the second image represent substantially the same portion of the inspection volume;
selecting, from the dual-pixel image, a region of interest including at least a portion of an item of interest and an associated background region;
determining a first basis material of the associated background region;
selecting a first basis function that is derived from an attenuation characteristic associated with the region of interest based on the determined first basis material; and representing the region of interest in terms of an amplitude associated with the first basis function and an amplitude associated with a second basis function.

2. The method of claim 1, wherein the imaged background region coincides at least in part with the item of interest.

3. The method of claim 2, wherein one of the first basis function and the second basis function corresponds to a material that has an effective atomic number similar to an effective atomic number of the associated background.

4. The method of claim 1, wherein the amplitude associated with the first basis function and the amplitude associated with the second basis function are computed for a selected region within the item of interest and a selected region within the associated background, and a property of the item of interest is derived based on both an amplitude associated with the first basis function and an amplitude associated with the second basis function.

5. The method of claim 4, wherein the attenuation characteristic is a measured attenuation of photon intensity.

6. The method of claim 5, wherein the measured attenuation of photon intensity is the measured attenuation of photon intensity in the selected region of background.

7. The method of claim 4, further comprising:
representing the selected region within the item of interest and the selected region of background with two pre-selected basis materials; and
determining a ratio of the amplitudes of the two pre-selected basis materials.

8. The method of claim 1, further comprising determining a property of the region of interest based on an amplitude associated with the first basis function and an amplitude associated with the second basis function in the selected region of interest.

9. The method of claim 8, wherein the property of the item of interest is an effective atomic number.

10. The method of claim 8, further comprising:
determining, based on the property of the item of interest, whether the item of interest includes a material of interest.

11. The method of claim 10, further comprising:
accessing third data representing the inspection volume; and
displaying the third data and the image of the item of interest.

12. The method of claim 11, wherein the third data is data that represents the inspection volume using energy of a different type than the higher-energy radiation and the lower-energy radiation.

13. The method of claim 12, wherein the third data is an image of the inspection volume taken with a sensor sensitive to visible or infrared radiation.

14. The method of claim 11, wherein the third data and the image of the item of interest are displayed concurrently.

15. The method of claim 11, wherein the item of interest includes a material of interest, and further comprising displaying a marker to indicate the presence of the material of interest.

16. The method of claim 1, wherein the attenuation characteristic is a measured attenuation of photon intensity.

17. The method of claim 1, wherein the first basis function corresponds to a first material, and the second basis function corresponds to a second material.

18. The method of claim 17, wherein the first material is an elemental material and the second material is an elemental material having a different effective atomic number than the first material.

19. The method of claim 1, wherein the low-energy image represents an attenuation of the lower-energy radiation caused by passing the lower-energy radiation through the inspection volume, and the high-energy image represents an attenuation of the higher-energy radiation caused by passing the higher-energy radiation through the inspection volume.

20. The method of claim 19, wherein data representing the inspection volume is generated by a sequence of measurements associated with a one-dimensional array.

21. The method of claim 1, wherein the emitted higher-energy radiation and the emitted lower-energy have an energy distribution that is substantially not mono-energetic.

22. The method of claim 1, further comprising:
determining an amplitude of the selected first basis function and the second basis function;
generating an image of the inspection volume including the item of interest, the image of the item of interest including a pixel having a pixel value equal to a function of the amplitude of the first basis function and the second basis function; and
displaying the image of the item of interest.

23. The method of claim 1, further comprising:
decomposing the region of interest based on three or more basis functions;
determining amplitudes of the basis functions in the region of interest; and
determining a property of the region of interest based on the amplitudes of the basis functions.

24. The method of claim 1, wherein a pixel of the dual-pixel image is associated with an attenuation value corresponding to the lower-energy radiation and an attenuation value corresponding to the higher-energy radiation.

25. The method of claim 1, wherein the portion of the inspection volume encompasses the entire inspection volume.

26. The method of claim 1, wherein at least one of the amplitude of the first basis function or the amplitude of the second basis function is derived by using a predetermined formula or using a precomputed lookup table having inputs that are derived from the dual-pixel image data.

27. The method of claim 1, wherein an indicator of an areal density of a selected portion of the region of interest is estimated based on the amplitude of the first basis function and the amplitude of the second basis function.

28. The method of claim 27, wherein the indicator of an areal density estimate is further based on an indicator of estimated effective atomic number.

29. The method of claim 28, wherein the indicator of estimated effective atomic number of a selected portion of the region of interest is estimated based on the amplitude of the first basis function and the amplitude of the second basis function.

30. The method of claim 29, wherein the effective atomic number estimate is further based on an indicator of estimated areal density.

31. The method of claim 1, wherein an amplitude associated with the first basis function corresponds to a thickness of the first basis material and an amplitude associated with
the second basis function corresponds to a thickness of a second basis material.

32. A non-transitory computer-readable medium encoded with a computer program comprising instructions that, when executed, operate to cause a computer to perform operations comprising:
generating, based on data representing attenuation of higher-energy radiation having a peak energy of at least 1 MeV passing through a portion of an inspection volume, a first image including a projection of the portion;

generating, based on data representing attenuation of lower-energy radiation passing through the portion of the inspection volume, a second image including a projection of the portion;

creating a dual-pixel image from the first image and the second image, wherein a pixel of the dual-pixel image, a pixel of the first image, and a pixel of the second image represent substantially the same portion of the inspection volume;

selecting, from the dual-pixel image, a region of interest including at least a portion of an item of interest and an associated background region;

determining a first basis material of the associated background region;

selecting a first basis function that is derived from an attenuation characteristic associated with the region of interest based on the determining first basis material; and representing the region of interest in terms of an amplitude associated with the first basis function and an amplitude associated with a second basis function.

33. The medium of claim 32, wherein at least one of the higher-energy radiation or the lower-energy radiation includes x-ray photons.

34. The medium of claim 32, wherein an amplitude associated with the first basis function corresponds to a thickness of the first basis material and an amplitude associated with the second basis function corresponds to a thickness of a second basis material.

35. A system for examining an inspection volume, the system comprising:

a source configured to expose an inspection volume to:
higher-energy radiation having a peak energy of at least 1 MeV passing through a portion of the inspection volume; and
lower lower-energy radiation;

a detection system configured to:
detect the higher-energy radiation and the lower-energy radiation penetrating through the inspection volume;
generate data representing attenuation of the higher-energy radiation based on the detection; and
generate data representing attenuation of the lower-energy radiation based on the detection; and a data analysis system configured to:
generate, based on the data representing attenuation of the higher-energy radiation, a first image including a projection of the portion;
generate, based on the data representing attenuation of the lower-energy radiation passing through the portion of the inspection volume, a second image including a projection of the portion;
create a dual-pixel image from the first image and the second image, wherein a pixel of the dual-pixel image, a pixel of the first image, and a pixel of the second image represent substantially the same portion of the inspection volume;
select, from the dual-pixel image, a region of interest including at least a portion of an item of interest and an associated background region;
determine a first basis material of the associated background region;
select a first basis function that is derived from an attenuation characteristic associated with the region of interest based on the determining first basis material; and
represent the region of interest in terms of an amplitude associated with the first basis function and an amplitude associated with a second basis function.

36. The system of claim 35, wherein an amplitude associated with the first basis function corresponds to a thickness of the first basis material and an amplitude associated with the second basis function corresponds to a thickness of a second basis material.

* * * * *